United States Patent
Uehara et al.

(10) Patent No.: US 11,296,934 B2
(45) Date of Patent: Apr. 5, 2022

(54) DEVICE PROVISIONING SYSTEM

(71) Applicant: INTERNETWORKING & BROADBAND CONSULTING CO., LTD., Tokyo (JP)

(72) Inventors: Toshiyuki Uehara, Tokyo (JP); Ken Tajima, Tokyo (JP)

(73) Assignee: INTERNETWORKING & BROADBAND CONSULTING CO., LTD., Tokyo (JP)

( * ) Notice: Subject to any disclaimer, the term of this patent is extended or adjusted under 35 U.S.C. 154(b) by 339 days.

(21) Appl. No.: 16/333,943

(22) PCT Filed: May 25, 2018

(86) PCT No.: PCT/JP2018/020121
§ 371 (c)(1),
(2) Date: Mar. 15, 2019

(87) PCT Pub. No.: WO2018/230305
PCT Pub. Date: Dec. 20, 2018

(65) Prior Publication Data
US 2019/0207813 A1    Jul. 4, 2019

(30) Foreign Application Priority Data

Jun. 16, 2017    (JP) .............................. JP2017-119016

(51) Int. Cl.
*H04L 41/0806*    (2022.01)
*H04L 9/08*    (2006.01)
(Continued)

(52) U.S. Cl.
CPC ...... *H04L 41/0806* (2013.01); *G06F 16/1824* (2019.01); *G06F 21/6209* (2013.01);
(Continued)

(58) Field of Classification Search
CPC ...... H04L 9/0894; H04L 9/321; H04L 63/062
See application file for complete search history.

(56) References Cited

U.S. PATENT DOCUMENTS

2009/0300758 A1    12/2009    Hauck et al.
2011/0258434 A1*   10/2011    Qiu ..................... H04L 63/0823
                                                                    713/153
(Continued)

FOREIGN PATENT DOCUMENTS

JP    2009-124520 A    6/2009
JP    2013-254506 A    12/2013
(Continued)

OTHER PUBLICATIONS

Higashikado, Yoshiki et al, "A study on certificate management in consortium chain", Proceedings of the 2017 SCIS, 1F2-3, pp. 1-4, (Jan. 24, 2017); See the attached English translation of International Search Report for a concise explanation of the relevance.
(Continued)

*Primary Examiner* — Tae K Kim
(74) *Attorney, Agent, or Firm* — Calfee Halter & Griswold LLP

(57) ABSTRACT

To provide a provisioning system capable of providing a valid device with valid provisioning data and preventing intrusion of an unauthorized device.
A device provisioning system that provides a device 4 with provisioning data for provisioning the device 4 includes: public key providing means configured to acquire a first public key unique to the device 4 from a blockchain 2 storing the first public key in association with a first trail in response to a query using the first trail; and provisioning data providing means configured to acquire the first public key through the public key providing means in response to a
(Continued)

query using the first trail from the device 4 and transmit the provisioning data encrypted with the first public key to the device 4.

7 Claims, 26 Drawing Sheets

(51) Int. Cl.
*H04L 9/32* (2006.01)
*H04L 9/06* (2006.01)
*G06F 16/182* (2019.01)
*G06F 21/62* (2013.01)
*G06F 21/64* (2013.01)

(52) U.S. Cl.
CPC ............ *G06F 21/64* (2013.01); *H04L 9/0643* (2013.01); *H04L 9/08* (2013.01); *H04L 9/0825* (2013.01); *H04L 9/3247* (2013.01); *G06F 2221/2129* (2013.01); *H04L 2209/38* (2013.01)

(56) References Cited

U.S. PATENT DOCUMENTS

| | | | |
|---|---|---|---|
| 2012/0054842 A1* | 3/2012 | Urios Rodriguez ... | G06Q 20/40 726/6 |
| 2013/0219381 A1* | 8/2013 | Lovitt ....................... | G06F 8/65 717/173 |
| 2015/0244690 A1 | 8/2015 | Mossbarger | |
| 2015/0277930 A1 | 10/2015 | Sarangdhar et al. | |
| 2015/0319151 A1* | 11/2015 | Chastain ............... | H04W 12/35 713/171 |
| 2016/0283941 A1* | 9/2016 | Andrade ............ | G06Q 20/3829 |
| 2016/0294783 A1* | 10/2016 | Piqueras Jover ..... | H04L 9/3271 |
| 2016/0321752 A1* | 11/2016 | Tabacco ............. | G06Q 20/3223 |
| 2017/0005798 A1* | 1/2017 | Chow ..................... | H04L 67/06 |
| 2017/0250972 A1* | 8/2017 | Ronda .................. | H04L 63/123 |
| 2018/0083771 A1* | 3/2018 | Bonnell ............... | H04L 9/3247 |
| 2018/0097635 A1* | 4/2018 | Moses ................. | H04L 63/0442 |
| 2018/0097638 A1* | 4/2018 | Haldenby .............. | G01C 15/00 |
| 2018/0157840 A1* | 6/2018 | Crowley ............... | H04L 9/0861 |
| 2018/0183587 A1* | 6/2018 | Won ...................... | H04L 9/0891 |
| 2018/0183777 A1* | 6/2018 | Guillory ............... | H04L 9/3271 |
| 2018/0240107 A1* | 8/2018 | Andrade ............... | G06Q 20/36 |
| 2018/0254898 A1* | 9/2018 | Sprague ............... | H04L 9/3271 |
| 2019/0005470 A1* | 1/2019 | Uhr ...................... | G06F 16/2379 |
| 2019/0163883 A1* | 5/2019 | Savanah ............... | H04L 9/3236 |
| 2019/0238344 A1* | 8/2019 | Kaga ...................... | G06F 21/32 |
| 2019/0319808 A1* | 10/2019 | Fallah ...................... | H04L 9/30 |
| 2019/0347433 A1* | 11/2019 | Chakravorty ............ | H04L 9/30 |

FOREIGN PATENT DOCUMENTS

JP 2017-511530 A 4/2017
WO 2005/104431 A1 11/2005

OTHER PUBLICATIONS

International Search Report issued in PCT/JP2018/020121, dated Aug. 14, 2018, 5 pages.

* cited by examiner

FIG. 8
(a)
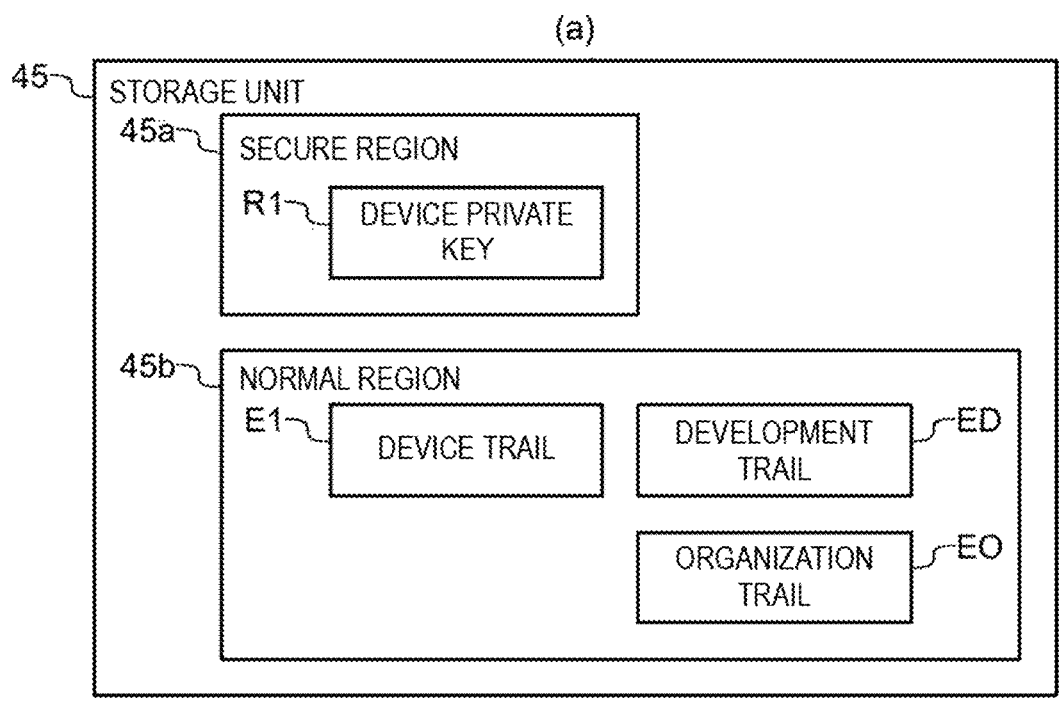
(b)
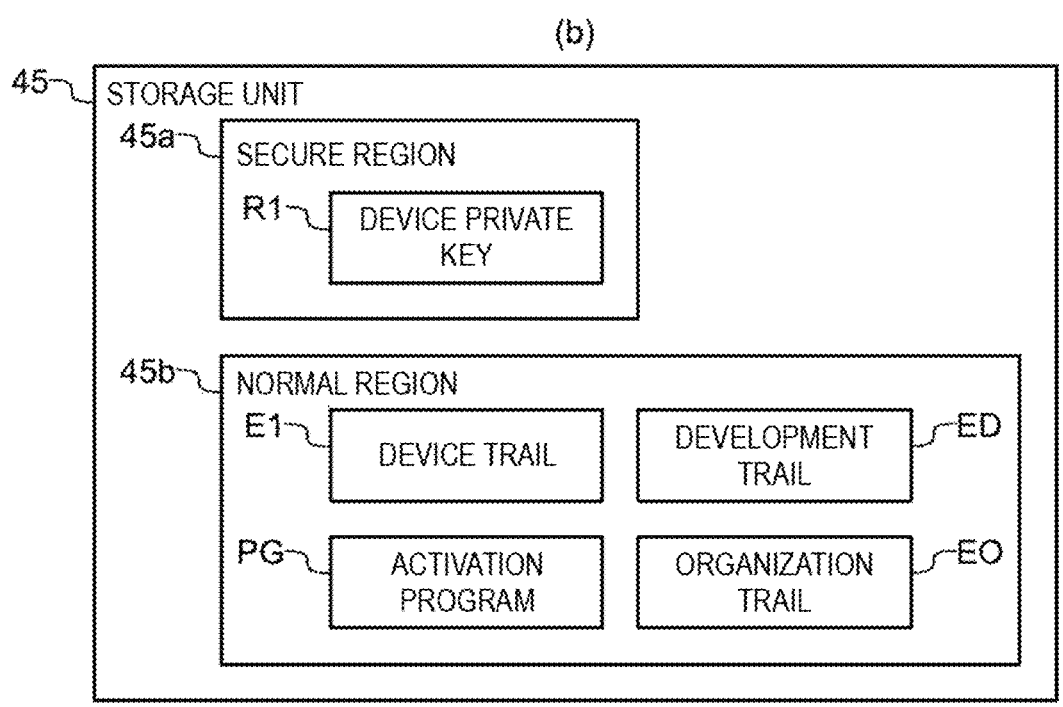

DEVICE PROVISIONING SYSTEM

TECHNICAL FIELD

The present invention relates to a device provisioning system configured to, for example, provide appropriate resources to a device.

BACKGROUND ART

Currently, various devices are widely used that include devices directly used by a user, such as a cellular phone, a smartphone, and a personal computer, and an IoT (Internet of Things) device configured to automatically transmit information acquired by a sensor or the like to a server.

A software update program is executed on a device as described above in many cases. In past days, a physical media or the like was distributed from the vendor of the device to the user, and update work was performed by the user. However, in present days, a fast internet network is widely available, and thus an update program is downloaded and distributed through the Internet and applied to the device through an operation by the user or automatically in many cases.

Resources such as program files used on the device, such as an application program, an operating system, and a firmware, and setting files used by the program files are provided to the device in some cases. This processing that involves providing resources to the device and preparing for execution of a predetermined operation is referred to as provisioning.

For example, Patent Literature 1 discloses a provisioning method in which the validity of a firmware is checked at booting of a hardware platform such as a computer, and in a case of insufficiency or damage, another firmware is acquired through an external interface such as a universal serial bus (USB) port or an Ethernet (registered trademark) port.

In a system including an IoT device, a method called edge computing is often used. FIG. 30 illustrates an exemplary configuration of a conventional IoT system. In the system, data acquired by a plurality of IoT devices 8 denoted by 8$a$1, 8$a$2, 8$a$3, 8$b$1, 8$b$2, and 8$b$3 is collected and analyzed by a management server 6. In such a system, edge servers 7 denoted by 7$a$ and 7$b$ are prepared in some cases between each IoT device 8 and the management server 6 instead of direct communication therebetween.

With this configuration, each individual edge server 7 is connected with the IoT devices 8 managed by the edge server 7 through one of local area networks (LAN) denoted by LANa and LANb, and is connected with the management server 6 through a WAN such as the Internet. In this manner, networks divided into a plurality of segments are used.

When each IoT device 8 is directly connected with the WAN without using the edge server 7, a security risk increases and measures need to be taken at the individual IoT device 8. For example, secure communication is performed by using the security sockets layer (SSL), and an electronic certificate is issued for each IoT device 8 for use in the communication. This leads to, for example, increase of a processing cost at the IoT device 8 for communication encryption and the like, and increase of an operation cost taken for issuing and management of electronic certificates.

For these reasons, as illustrated in FIG. 30, the edge server 7 and the individual IoT device 8 are connected with each other through a LAN having a low security risk as compared to a WAN, and only the edge server 7, which has more processing cost allowance than the IoT device 8, is connected with the WAN.

CITATION LIST

Patent Literature

[Patent Literature 1] National Publication of International Patent Application No. 2017-511530

SUMMARY OF INVENTION

Technical Problem

When various devices are used as described above, some devices are used in a situation in which no one correctly manages the devices or are not selected as management targets for some reason, which causing, for example, security problems. In particular, in a case of IoT devices, a security risk is high due to what is called an unknown IoT device on which correct management is not performed any more in this manner, and the device is unknowingly used as a steppingstone for attack in actual cases.

According to the method disclosed in Patent Literature 1, at activation of, for example, a computer, a firmware is acquired through an external interface as necessary to prevent the computer from performing an unauthorized operation. However, in a case of devices used in various places such as IoT devices, in particular, the device validity cannot be sufficiently achieved and managed by preventing an unauthorized device such as the above-described unknown IoT device from intruding into a system.

In a configuration in which, for example, data is collected from the individual IoT devices 8 through the edge server 7 as described with reference to FIG. 30, the individual IoT devices 8 are connected only to a private network such as a LAN, and thus it has been difficult to integrally perform management of these devices through a global network such as a WAN.

The present invention is intended to provide a device provisioning system capable of providing a valid device with valid provisioning data and preventing intrusion of an unauthorized device.

Solution to Problem

To solve the above-described problem, a device provisioning system according to the present invention is a device provisioning system that provides a device with provisioning data for provisioning the device and loads the provisioning data onto the device. The device provisioning system includes: public key providing means configured to acquire a first public key unique to the device from a blockchain storing the first public key in association with a first trail unique to the device in response to a query using the first trail; and provisioning data providing means configured to acquire the first public key through the public key providing means and transmit the provisioning data encrypted with the first public key to the device in response to a query using the first trail from the device. The device includes a storage unit including a secure region in which a first private key corresponding to the first public key is stored and a normal region in which the first trail is stored, and provisioning execution means configured to acquire the provisioning data encrypted in response to a query using the first trail to the provisioning data providing means and decrypt the encrypted provisioning data by using the first private key.

In this manner, when provisioning data is provided by using a pair of a private key and a public key unique to each device, a risk that the provisioning data is fraudulently acquired by a third party is eliminated so that provisioning of the device can be performed at high security. In addition, when the public key is stored in a blockchain to assure validity, the validity of the public key of each device can be assured without cost and work in preparation of an electronic certificate for the device. The storage of a public key unique to each device in a blockchain is equivalent to management of the device through the status of registration to the blockchain, thereby preventing mixture of an unauthorized device out of the management into the system. In addition, the provisioning data cannot be loaded by a device other than a target device, and thus, for example, encryption of a communication path to the device can be simplified or omitted. Accordingly, the provisioning data can be securely provided also when a device at relatively low processing performance is used.

In a preferred embodiment of the present invention, the device provisioning system further includes trail registration means configured to acquire the first trail through registration of the first public key to the blockchain. When, in an initial state in which the device is not provided with the provisioning data, the provisioning data providing means is successful in verification of validity of the device based on the device identification data transmitted from the device while an initial use private key unique to the device is stored in the secure region, and device identification data including an initial use public key corresponding to the initial use private key is stored in the normal region, the provisioning data providing means performs generation of the first private key and the first public key, acquisition of the first trail through registration of the first public key to the blockchain by the trail registration means, and transmission of initial use data including the first private key and the first trail and encrypted with the initial use public key to the device. The provisioning execution means performs decryption of the encrypted initial use data by using the initial use private key and storage of the first private key in the secure region and the first trail in the normal region.

In this manner, when the provisioning data is provided to the device in the initial state based on verification of the validity of the device identification data, the device can be securely registered to the system.

In a preferred embodiment of the present invention, the device provisioning system further includes: trail invalidation means configured to invalidate the first trail and the first public key in the blockchain; and reinitialization instruction means configured to transmit a new initial use private key and new device identification data including a new initial use public key corresponding to the new initial use private key to the device. The device further includes reinitialization means configured to perform storage of the new initial use private key in the secure region, deletion of the first private key from the secure region, storage of the new device identification data in the normal region, deletion of the first trail from the normal region, and request of invalidation of the first trail and the first public key in the blockchain to the trail invalidation means.

In this manner, the device in the system can be reliably invalidated and returned to the initial state by performing, for example, invalidation of the trail and the public key on the blockchain and deletion of data from the device.

In a preferred embodiment of the present invention, when the provisioning data providing means checks necessity of updating the first trail and the first public key registered to the blockchain and determines that the first trail and the first public key need to be updated, the provisioning data providing means performs generation of a new first private key and a new first public key, and acquisition of a new first trail through registration of the new first public key to the blockchain by the trail registration means. The new first private key and the new first trail are included in the provisioning data. The provisioning execution means performs storage of the new first private key in the secure region, storage of the new first trail in the normal region, deletion of the first private key from the secure region, and deletion of the first trail from the normal region.

In this manner, a key of each device used for provisioning can be updated by regenerating when a key unique to the device as necessary to update data stored in the blockchain and data stored in the device, thereby maintaining the system in a secure state.

In a preferred embodiment of the present invention, the provisioning data includes a program file configured to operate on the device.

In this manner, the device can perform an expected operation through the program file included in the provisioning data.

In a preferred embodiment of the present invention, the program file is a program file for activation of the device, and the provisioning execution means acquires the provisioning data at activation of the device.

In this manner, the device can be activated in a normal state through distribution of the activation program file at activation of the device.

In a preferred embodiment of the present invention, the blockchain also stores a second trail and a second public key in association with each other, the provisioning data providing means performs the encryption of the provisioning data provided with an electronic signature based on a second private key corresponding to the second public key, the normal region also stores the second trail, and the provisioning execution means performs acquisition of the second public key through a query using the second trail to the public key providing means, and verification of the electronic signature based on the second private key by using the second public key.

In this manner, the validity of the provisioning data is assured by using the electronic signature, thereby preventing unauthorized provisioning data from being provided to the device.

In a preferred embodiment of the present invention, the device provisioning system further includes: a device authentication server including the public key providing means; and a provisioning server including the provisioning data providing means.

With this configuration including the device authentication server and the provisioning server, the provisioning server can be prepared for each provisioning target device or each device manufacturing vendor, thereby performing provisioning processing of various devices.

A provisioning method according to the present invention is a provisioning method of providing a device with provisioning data for provisioning the device and loading the provisioning data onto the device. The device includes a storage unit including a secure region in which a first private key corresponding to a first public key unique to the device is stored, and a normal region in which a first trail unique to the device and stored in a blockchain in association with the first public key is stored. The method includes: acquiring the first public key from the blockchain based on a query using the first trail from the device; encrypting the provisioning data with the first public key and transmitting the encrypted provisioning data to the device; and decrypting, by the device, the encrypted provisioning data by using the first private key.

Advantageous Effects of Invention

It is possible to provide a device provisioning system capable of eliminating a risk that provisioning data is fraudulently acquired by a third party so that device provisioning is performed at high security, and preventing mixture of an unauthorized device out of management into the system by storing a public key unique to each device in a blockchain and managing the device.

BRIEF DESCRIPTION OF DRAWINGS

FIG. 8 is a diagram illustrating the data structure of the storage unit of the device in the embodiment of the present invention after provisioning.

DESCRIPTION OF EMBODIMENTS

Figure 1:
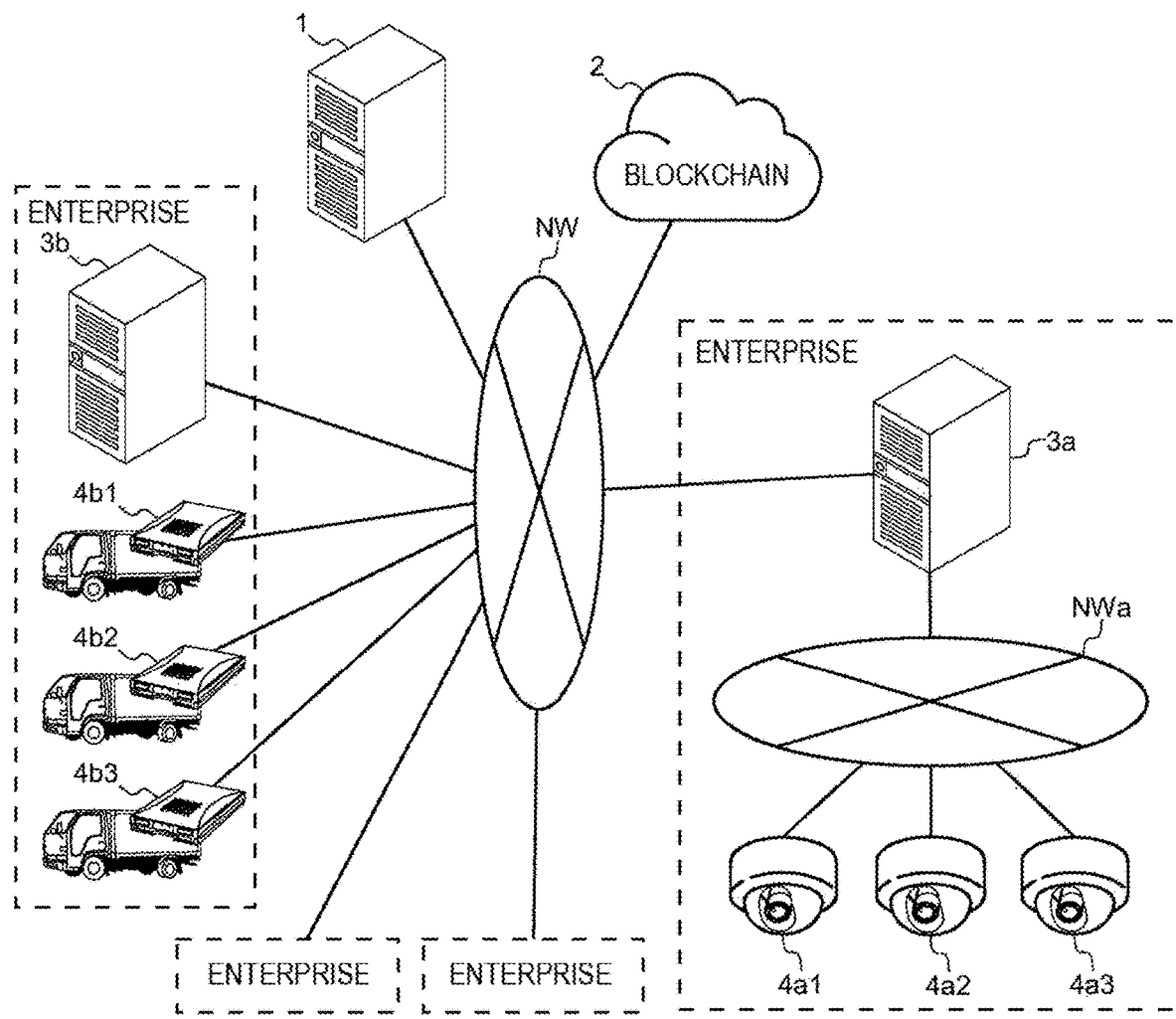
FIG. 1 is a configuration diagram of a device provisioning system according to an embodiment of the present invention.

The following describes an embodiment of the present invention in detail with reference to the accompanying drawings. FIG. 1 is a diagram illustrating the configuration of a device provisioning system according to the present embodiment. As illustrated in FIG. 1, the device provisioning system according to the present embodiment includes a device authentication server 1, a blockchain 2, provisioning servers 3 including provisioning servers 3a and 3b (hereinafter simply referred to as the provisioning servers 3 when not needed to be distinguished), and devices 4 including devices 4a1, 4a2, 4a3, 4b1, 4b2, and 4b3 (hereinafter simply referred to as the devices 4 when not needed to be distinguished).

The device authentication server 1 is configured to communicate with the blockchain 2 and the provisioning servers 3 through a network NW such as the Internet. The provisioning server 3a is configured to communicate with the devices 4a1, 4a2, and 4a3 through a network NWa, and the provisioning server 3b is configured to communicate with the devices 4b1, 4b2, and 4b3 through the network NW. The network NWa is, for example, a local area network (LAN) isolated from the Internet, or a network configured by a short-distance wireless communication standard such as ZigBee (registered trademark). The devices 4b1, 4b2, and 4b3 may be connected with the network NW through a mobile communication network such as 3G or 4G.

In FIG. 1, the frame surrounding the provisioning server 3a and the devices 4a1, 4a2, and 4a3 indicates a region managed by an organization (hereinafter referred to as "enterprise") such as a specific company or group. This notation also applies to the provisioning server 3b and the devices 4b1, 4b2, and 4b3. Additionally, another enterprise that manages a provisioning server 3 and devices 4 both not illustrated may be provided. When a provisioning server 3 and devices 4 are provided for each enterprise in this manner, a device 4 specialized in the business contents of the enterprise can be managed by the device provisioning system according to the present embodiment.

The blockchain 2 is originally used as a distributed ledger in bit coins as virtual currency, and is made up of a large number of nodes. However, for the sake of simplicity of description, the blockchain 2 is illustrated as a single component below as in FIG. 1.

The blockchain 2 is formed by a chain of data called a block, and each block includes hash value information of a block preceding the blockchain 2. Thus, when any block is falsified, inconsistency occurs in the chain relation. In addition, since it is a distributed system constituted by a large number of nodes, such unauthorized falsification processing, block deletion, or the like cannot be performed through, for example, an operation at a single node. In this specification, a block generated by registration of data related to each device 4 and data such as a public key (device public key) unique to the device 4 is referred to as a trail.

A public key is used in a pair with a private key in a public key encryption scheme. In this scheme, data encrypted with the private key can be decrypted only by the corresponding public key, and conversely, data encrypted by the public key can be decrypted only by the corresponding private key.

The device provisioning system according to the present embodiment uses three roughly classified kinds of sets of a private key, a public key, and a trail obtained by registration of the public key to the blockchain 2. The first set includes, an above-described device public key, the corresponding device private key, and a device trail obtained by registering the device public key to the blockchain 2, and these are unique to each device 4. The second set includes a development private key, a development public key, and a development trail uniquely prepared for a unit such as a development team or a development project of each device 4. In other words, this set is unique for each unit such as the product type of the device 4. The third set includes an organization private key, an organization public key, and an organization trail uniquely prepared for each organization such as a vender that manufactures the device 4. In this manner, an identical organization private key, an identical organization public key, and an identical organization trail are used in a development team or development project belonging to an identical organization; an identical development private key, an identical development public key, and an identical development trail are used in each device 4 belonging to an identical development team or development project; and an identical device private key, an identical device public key, and an identical device trail unique for each device 4 are used. Accordingly, these keys and trails are hierarchized.

The present embodiment describes above a configuration using sets of a private key, a public key, and a trail at three levels for each organization, each development team or development project, and each device 4, which are needed in each processing to be described later, but the present invention is not limited thereto. A larger or smaller number of types of private keys, public keys, and trails may be used as necessary. For example, a development private key, a development public key, and a development trail used for a device 4 of an identical product type handled by an identical development team or development project may be different between areas in which the device 4 is used. In this manner, private keys, public keys, and trails may be used in a more detailed manner in addition to the private keys, public keys, and trails at three levels exemplarily described in the present embodiment, thereby improving security.

In the present embodiment, it is assumed that acquisition of an organization trail through registration of an organization public key to the blockchain 2, and acquisition of a development trail through registration of a development public key to the blockchain 2 are completed in advance. To achieve this, acquisition of a trail through registration of each public key to the blockchain 2 may be performed in advance based on, for example, operation of a provisioning server 3 or another computer device (not illustrated).

The organization private key, the organization trail, the development private key, and the development trail are deployed at necessary places in advance by an optional method. Use of each key will be described in detail in later description of each processing. The organization trail, the organization private key, the development trail, and the development private key are deployed at the provisioning server 3, and the organization private key is deployed at a production site system 5. The acquisition of a public key needed in each processing is performed through a query using a trail to the device authentication server 1 as described later. However, the development public key is preferably deployed at the production site system 5 in advance to achieve an environment in which the production site system 5 is isolated from the network NW. Each private key and each trail may be deployed by an optional method by, for example, an organization, a development team, or a development project administrator that manages the keys, but in particular, the deployment of a private key needs to be performed by secure means such as transfer on a physical storage medium to avoid the risk of leak or the like. Appropriate management such as periodic update is preferably performed on each trail, each private key, and each public key by, for example, an organization or a development team that manages the keys.

In addition, private and public keys to be used by the device authentication server 1 may be separately prepared, and at trail distribution as described above, an electronic signature based on the private key may be provided or may be included in a trail. With this configuration, when a public key acquisition request using a trail is received by the device authentication server 1, whether the trail is a legitimate trail issued by the device authentication server 1 can be checked through verification of an electronic signature based on a public key.

In the provisioning system according to the present embodiment, the reliability of a public key used in processing such as provisioning of the device 4 is assured by using the blockchain 2. In other words, the above-described characteristic of the blockchain 2 that does not allow unauthorized falsification processing, block deletion, and the like is utilized to enable registration of a public key to the blockchain 2 and generation of a trail only through valid processing by the device authentication server 1 to be described later. This assures that a public key existing in an effective state on the blockchain 2 is a valid key not subjected to unauthorized falsification processing or the like.

In the present embodiment, a public key or the like is registered onto the blockchain 2 to obtain a trail, but the present invention is not limited thereto. For example, the trail acquisition may be performed by registering, onto the blockchain 2, information such as information related to a device, information related to a development team, or information related to an organization, and a securely managed database may be separately prepared for the public key and managed in association with the trail.

Figure 2:
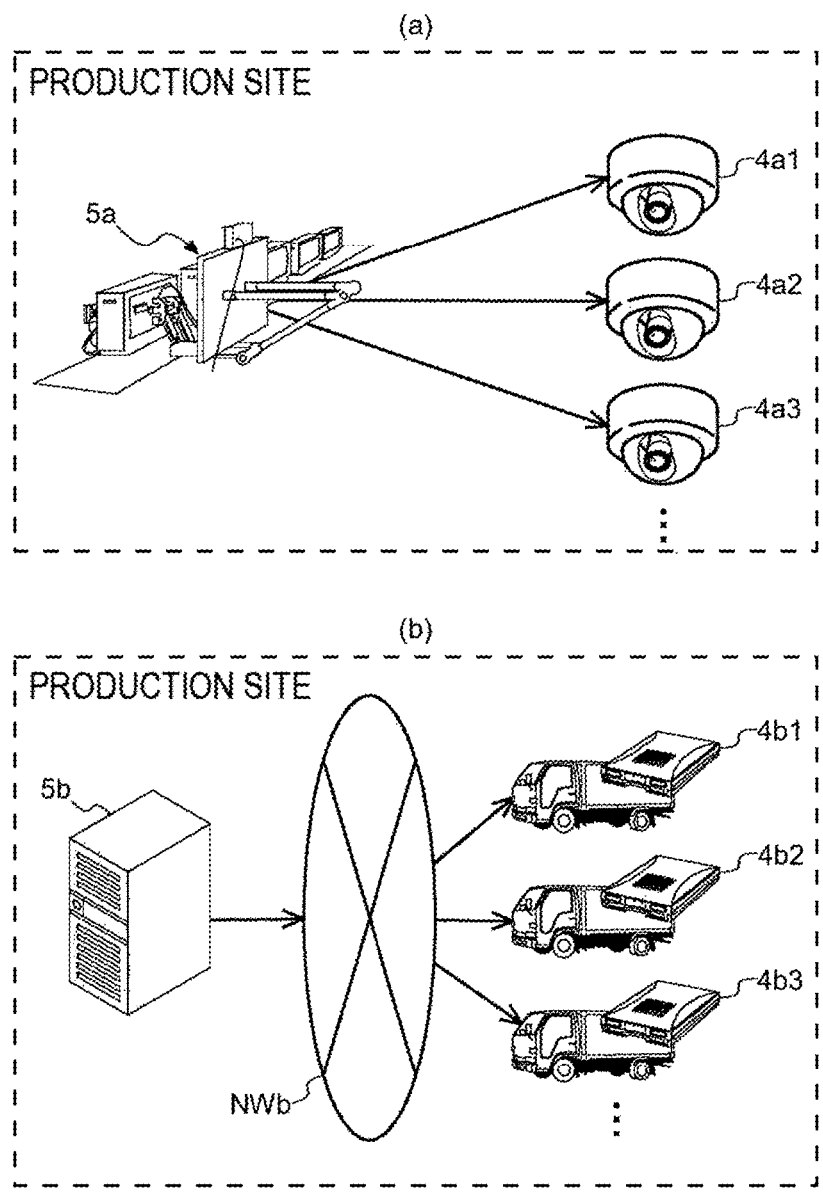
FIG. 2 is a system configuration diagram of a production site of a device according to the embodiment of the present invention.

FIG. 2 is a diagram illustrating the system configuration of a production site of the devices 4 of each enterprise. FIG. 2(*a*) illustrates a production site of an enterprise that manages the devices 4*a*1, 4*a*2, and 4*a*3, where, for example, data writing is performed on the devices 4*a*1, 4*a*2, and 4*a*3 by a production site system 5*a*. FIG. 2(*b*) illustrates a production site of an enterprise that manages the devices 4*b*1, 4*b*2, and 4*b*3, where the devices 4*b*1, 4*b*2, and 4*b*3 are connected with a production site system 5*b* through a network NWb such as a LAN in the production site, and provided with, for example, data writing. The system configuration in each enterprise production site may be any optional configuration that allows necessary data writing to each device 4 by the production site system 5 to be described later in detail.

<Configuration of Each Component>

Figure 3:
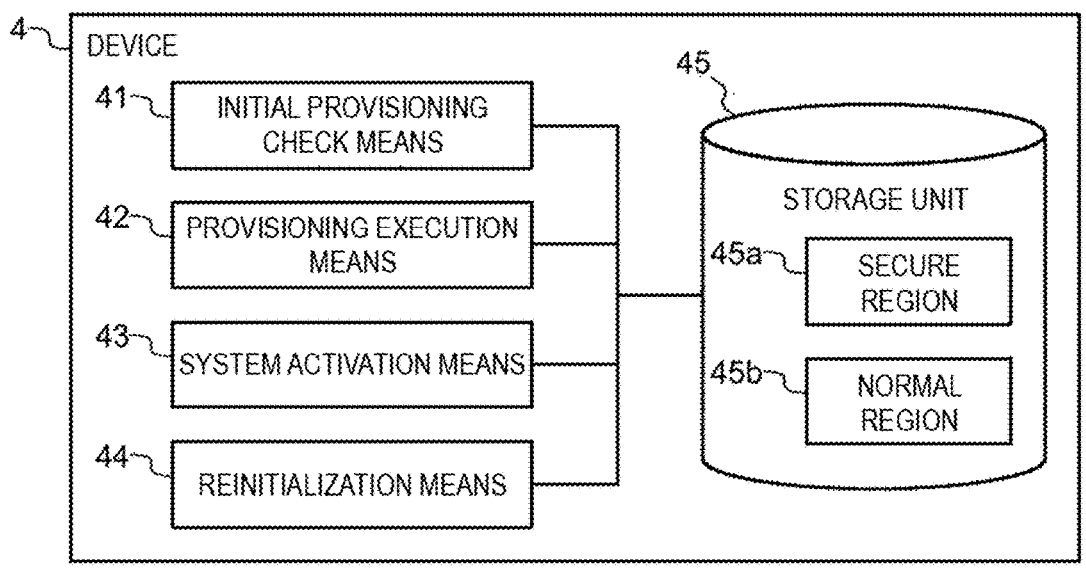
FIG. 3 is a functional block diagram of the device according to the embodiment of the present invention.

FIG. 3 is a functional block diagram of each device 4. As illustrated in FIG. 3, the device 4 includes initial provisioning check means 41 configured to determine whether the device 4 is in an initial state, provisioning execution means 42 configured to, for example, acquire provisioning data from the provisioning server 3 and load the acquired provisioning data, system activation means 43 configured to perform various kinds of processing at activation of the device 4, reinitialization means 44 configured to perform reinitialization processing to return the device 4 to the initial state, and a storage unit 45.

The storage unit 45 includes a secure region 45*a* and a normal region 45*b*. The secure region 45*a* is treated differently from the normal region 45*b* and can be accessed only by, for example, the initial provisioning check means 41 and the provisioning execution means 42.

The device 4 may be a typical computer device including an arithmetic device such as a central processing unit (CPU), a main storage device such as a random access memory (RAM), an auxiliary storage device such as a hard disk drive (HDD), a solid state drive (SSD), or a flash memory, and various kinds of input and output devices including connection means to a network. The device 4 may include a SoC (System on a Chip) in which the arithmetic device, the main storage device, the auxiliary storage device, and the like are mounted as a single chip. More specifically, a computer program for causing the device 4 to operate as each means as described above may be stored in the auxiliary storage device at manufacturing, and loaded onto the main storage device to perform computation by the arithmetic device, thereby performing, for example, control of input and output means. In this manner, the computer device can be used as the device 4 in the device provisioning system according to the present embodiment. Such a computer device may be, for example, what is called an IoT device such as a monitoring camera or an on-board instrument, or a terminal such as a personal computer or a smartphone.

The secure region 45*a* may be achieved by, for example, dedicated hardware such as a trusted platform module (TPM), or a physically or logically separated partial region of the auxiliary storage device. In other words, as described above, the secure region 45*a* may be a configuration that can be accessed only by the initial provisioning check means 41, the provisioning execution means 42, and the like. It is preferable that a log is constantly acquired and managed at access such as reading to or writing from the secure region 45*a*.

Figure 29:
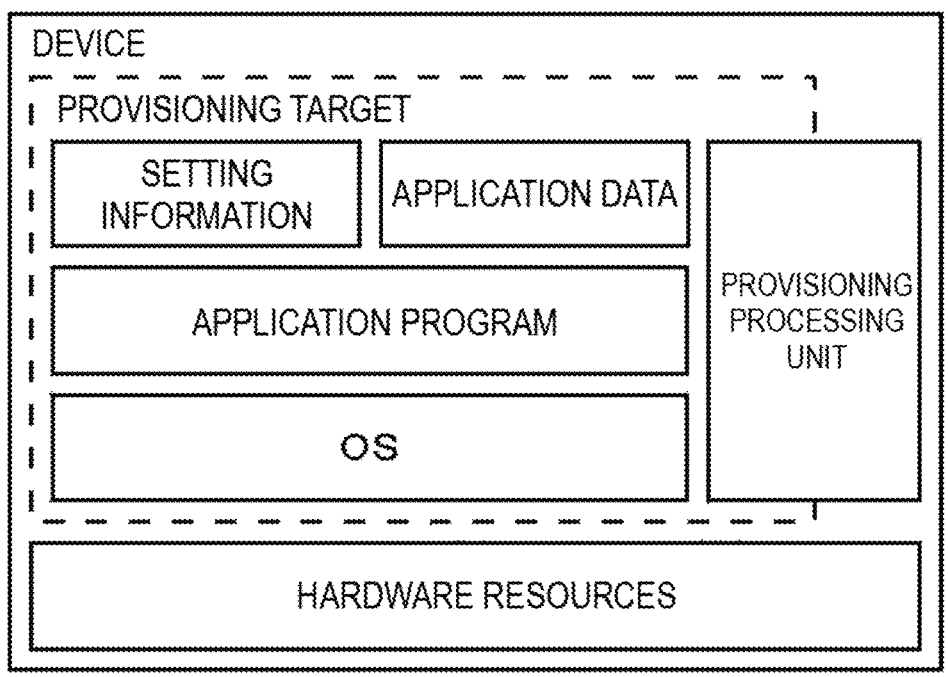
FIG. 29 is a diagram illustrating a schematic logical configuration of the device according to the present embodiment.
Figure 30:
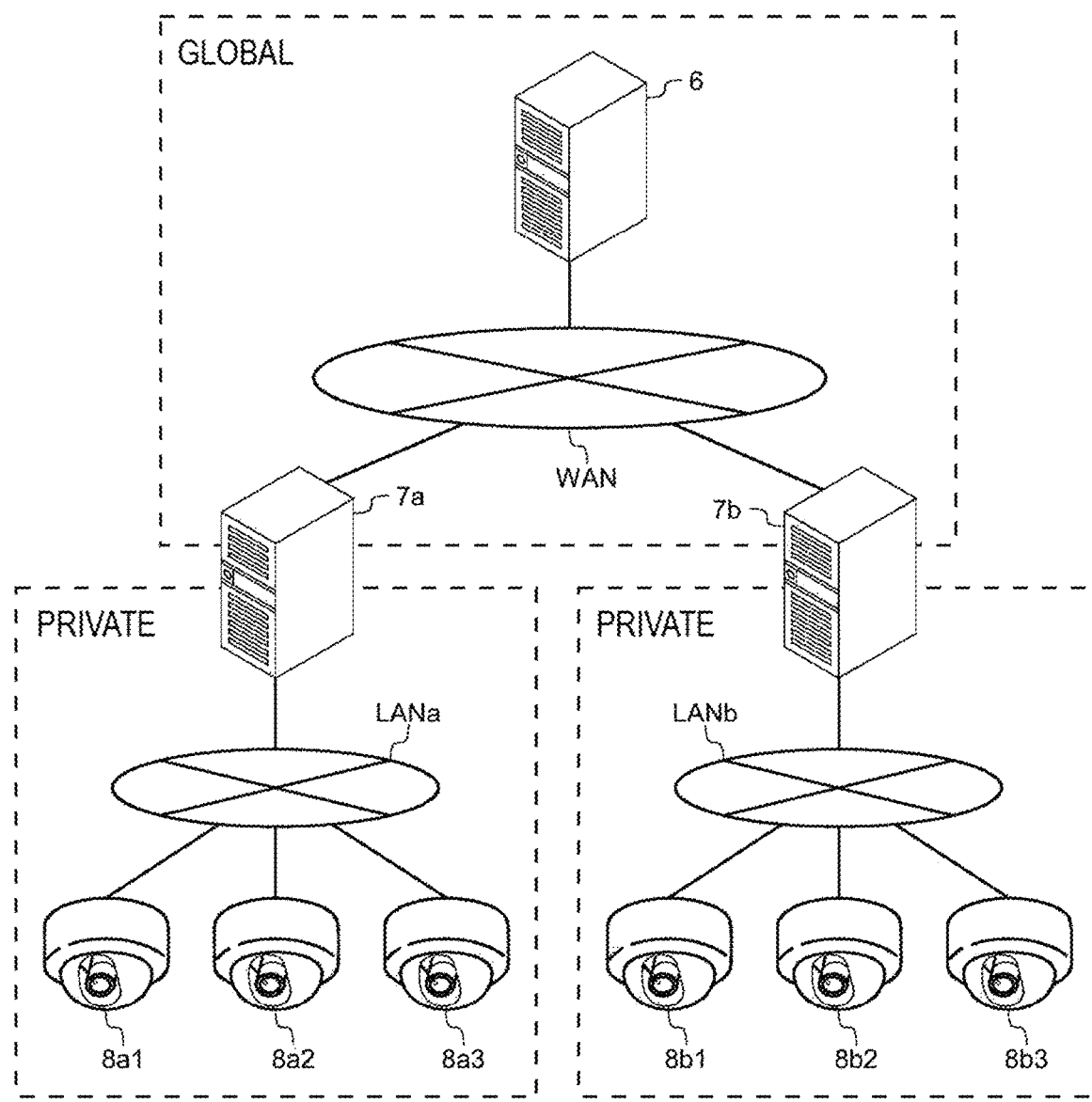
FIG. 30 is a diagram illustrating an exemplary configuration of a conventional IoT system.

FIG. 29 is a diagram illustrating a schematic logical configuration of the device 4. As illustrated in FIG. 29, an operating system (OS) operates on the device 4 by using hardware resources such as the CPU and the RAM. An application program that uses setting information and application data operates on the OS. A provisioning processing unit including, for example, the initial provisioning check means 41, the provisioning execution means 42, and the reinitialization means 44 is configured to perform an independent operation by using the hardware resources without the OS interposed therebetween. The provisioning processing unit receives, as a provisioning target from the provisioning server 3, provisioning data including the OS, the application program, and the setting information illustrated with a dashed line in FIG. 29, and loads the provisioning data. As the provisioning processing unit is illustrated inside the dashed line, the provisioning processing unit may be a provisioning processing target.

An optional OS such as Windows (registered trademark), Linux (registered trademark), or a RTOS used for an incorporated instrument operates on the device 4. Such an OS may be disposed on the auxiliary storage device of the device 4 in advance, or may be provided as an activation program from the provisioning server 3 in provisioning processing of the device 4 to be described later.

Figure 4:
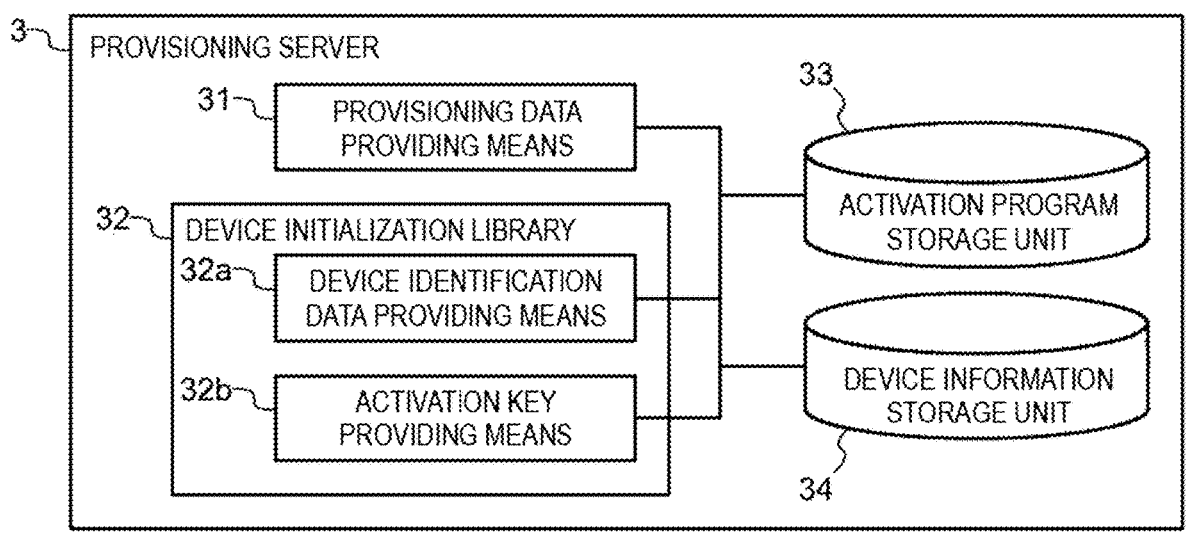
FIG. 4 is a functional block diagram of a provisioning server according to the embodiment of the present invention.

FIG. 4 is a functional block diagram of the provisioning server 3. As illustrated in FIG. 4, the provisioning server 3 includes provisioning data providing means 31 configured to, for example, generate provisioning data and provide the provisioning data to the device 4, a device initialization library 32 as a library for performing reinitialization processing of the device 4, an activation program storage unit 33 storing an activation program as a computer program executed at activation of the device 4, and a device information storage unit 34 storing information of the device 4 managed by the enterprise. The device initialization library 32 includes device identification data providing means 32*a* configured to provide device identification data to be described later at the reinitialization processing of the device 4, and activation key providing means 32*b* configured to provide an activation key to be described later.

The activation program may be a program file including the OS that operates on the device 4 as illustrated as a provisioning target in FIG. 29, or a program file including resources such as an application program that operates on the OS and setting information thereof. Alternatively, the activation program may be a computer program stored on the auxiliary storage device of the device 4 in advance and used to call the OS.

The provisioning server 3 may be a typical computer device including, for example, an arithmetic device such as a CPU, a main storage device such as a RAM, an auxiliary storage device such as a HDD, a SSD, or a flash memory, and various kinds of input and output devices including connection means to the network NW. More specifically, a computer program for causing the provisioning server 3 to operate as each means as described above may be stored in the auxiliary storage device in advance or upon, for example, an operation by the administrator of the provisioning server 3, and loaded onto the main storage device to perform computation by the arithmetic device, thereby performing, for example, control of input and output means. In this manner, the computer device can be used as the provisioning server 3 in the device provisioning system according to the present embodiment. In the present embodiment, the provisioning server 3 is achieved by the single computer device, but the present invention is not limited thereto. For example, the provisioning server 3 may be achieved by a plurality of computer devices in a configuration in which, for example, each storage unit is included in another computer device.

Figure 5:
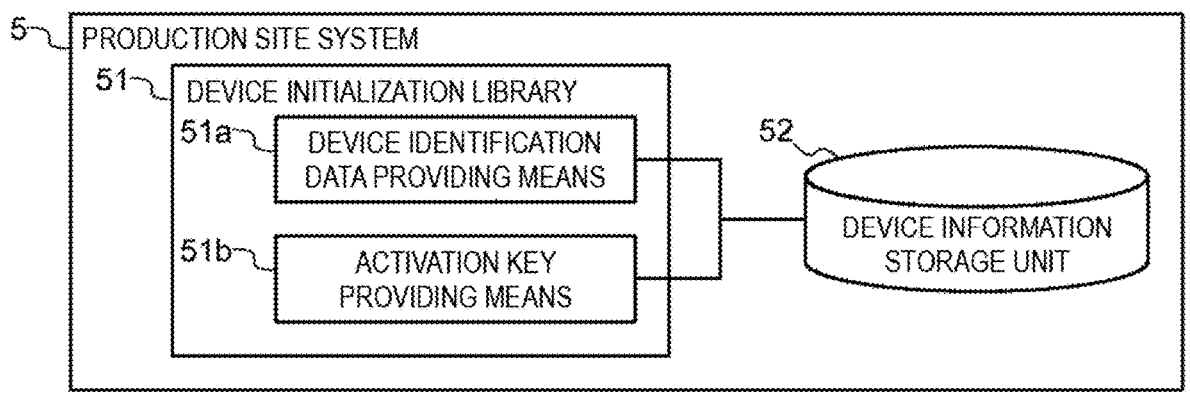
FIG. 5 is a functional block diagram of a production site system according to the embodiment of the present invention.

FIG. 5 is a functional block diagram of the production site system 5. As illustrated in FIG. 5, the production site system 5 includes a device initialization library 51 as a library for performing initializing processing at manufacturing of the device 4, and a device information storage unit 52 storing information related to the device 4 provided with the initializing processing at the production site. The device initialization library 51 includes device identification data providing means 51*a* configured to provide the device identification data at the initializing processing of the device 4, and activation key providing means 51*b* configured to provide an activation key. The device initialization library 51 included in the production site system 5 may be same as the device initialization library 32 included in the provisioning server 3.

The production site system 5 may be achieved by a manufacturing facility of the device 4. This configuration may include, for example, a dedicated device configured to perform, for example, data writing to the device 4 in addition to the device initialization library 51 and the device information storage unit 52, or may include a computer device including the device initialization library 51 and the device information storage unit 52 to perform data writing to the device 4 directly or through the dedicated device as described above.

Figure 6:
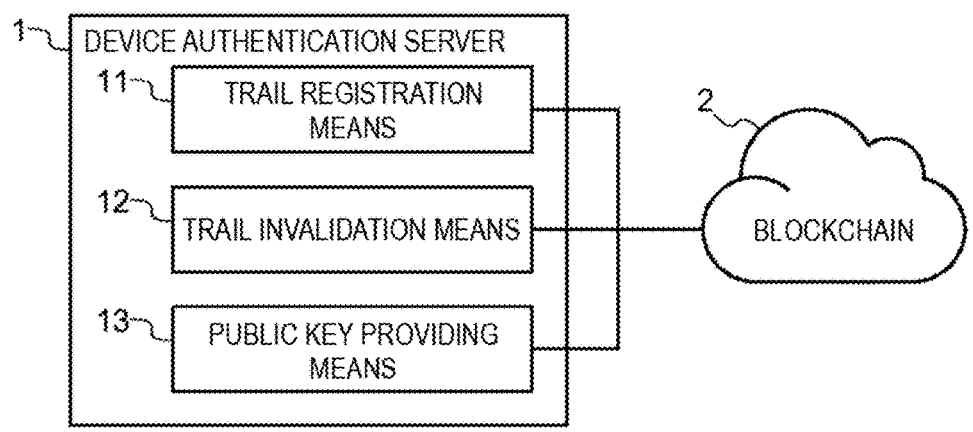
FIG. 6 is a functional block diagram of a device authentication server according to the embodiment of the present invention.

FIG. 6 is a functional block diagram of the device authentication server 1. As illustrated in FIG. 6, the device authentication server 1 includes trail registration means 11 configured to register a trail to the blockchain 2, trail invalidation means 12 configured to invalidate the trail on the blockchain 2, and public key providing means 13 configured to provide a public key on the blockchain 2 to, for example, the provisioning server 3.

The device authentication server 1 may be a typical computer device including, for example, an arithmetic device such as a CPU, a main storage device such as a RAM, an auxiliary storage device such as a HDD, a SSD, or a flash memory, and various kinds of input and output devices including connection means to the network NW. More specifically, a computer program for causing the device authentication server 1 to operate as each means as described above may be stored in the auxiliary storage device in advance or upon, for example, an operation by the administrator of the device authentication server 1, and loaded onto the main storage device to perform computation by the arithmetic device, thereby performing, for example, control of input and output means. In this manner, the computer device can be used as the device authentication server 1 in the device provisioning system according to the present embodiment. In the present embodiment, the device authentication server 1 is achieved by the single computer device, but the present invention is not limited thereto. For example, the device authentication server 1 may be achieved by a plurality of computer devices in a configuration in which, for example, each storage unit is included in another computer device. Alternatively, the means and storage units included in the provisioning server 3 may be included in the device authentication server 1 so that the provisioning server 3 and the device authentication server 1 are configured as a single computer device.

<Processing at Device Manufacturing>

Figure 12:
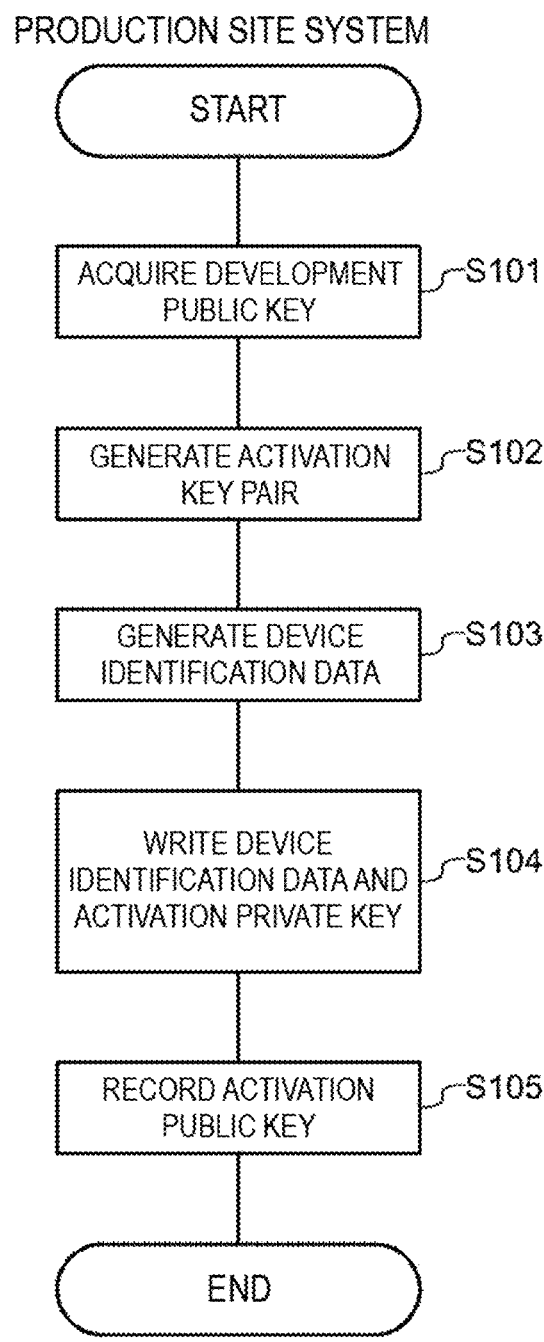
FIG. 12 is a flowchart illustrating the process of processing at device manufacturing in the embodiment of the present invention.

FIG. 12 is a flowchart illustrating the process of the initializing processing at manufacturing of the device 4 by the production site system 5. In the initializing processing, first at step S101, acquisition processing of a development public key is performed. The development public key is deployed on the production site system 5 in advance by an optional method as described above.

Subsequently at step S102, the activation key providing means 51*b* performs generation processing of an activation key pair. The activation key pair is a pair of an activation private key used in initial provisioning processing of the device 4 to be described later and an activation public key corresponding thereto, and is generated to be unique to the device 4.

At step S103, device identification data for identifying the device 4 in the initial provisioning processing is generated. This device identification data is generated by providing the activation public key generated at step S102 with an electronic signature based on an organization private key and encrypting the key with a development public key. The organization private key is deployed on the production site system 5 in advance by an optional method as described above.

Figure 9:
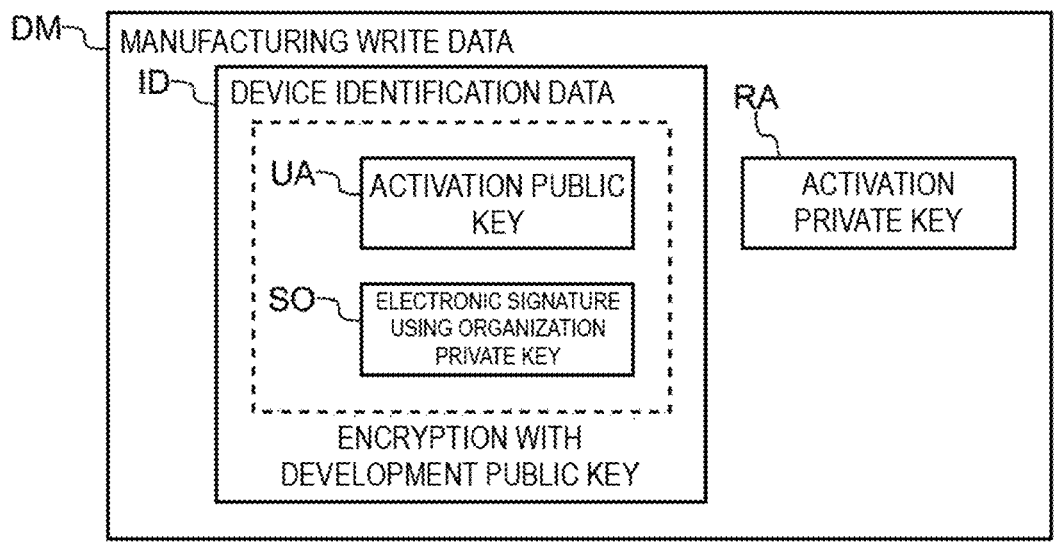
FIG. 9 is a diagram illustrating the structure of data written to the device at manufacturing in the embodiment of the present invention.

At step S104, the activation private key generated at step S102 and the device identification data generated at step S103 are written to the device 4. The written data is illustrated in FIG. 9 as manufacturing write data DM. The data includes device identification data ID generated by providing an activation public key UA with an electronic signature SO based on an organization private key and encrypting the key and electronic signature SO with a development public key as described above, and also includes an activation private key RA. The device identification data ID is written in the normal region 45*b* included in the storage unit 45, and the activation private key RA is written in the secure region 45*a* included in the storage unit 45.

Then, at step S105, the activation public key UA generated at step S102 is recorded in the device information storage unit 52 as information related to the device 4 provided with the initializing processing. For example, the MAC address of a network interface and the serial number of the device 4 may be additionally recorded as information for uniquely identifying the device 4. The information related to the device 4 recorded in the device information storage unit 52 in this manner is provided to the provisioning server 3 and stored in the device information storage unit 34 so that the information can be used later in the initial provisioning processing of the device 4.

Figure 7:
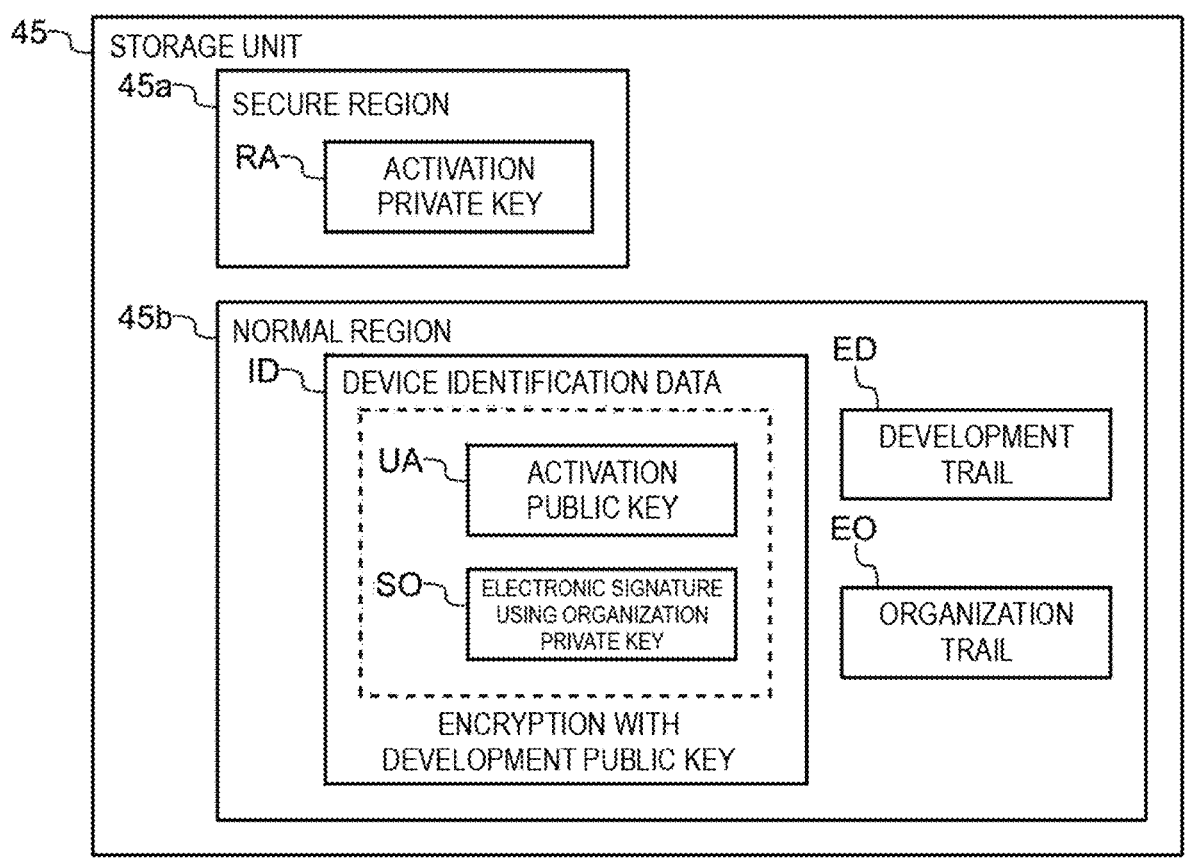
FIG. 7 is a diagram illustrating the data structure of a storage unit of the device in the embodiment of the present invention in an initial state.

FIG. 7 illustrates the structure of data included in the storage unit 45 after the initializing processing is completed through the above-described processing. As illustrated in FIG. 7, the activation private key RA is included in the secure region 45*a*, and the device identification data ID is included in the normal region 45*b*. The normal region 45*b* also includes a development trail ED associated with a development public key, and an organization trail EO associated with an organization public key. These trails are identical between all devices 4 manufactured by, for example, an identical development team in an identical organization. Thus, the writing processing may be performed to each device 4 manufactured by the production site system 5 before or after the device initializing processing described with reference to FIG. 12 or simultaneously with the device initialization processing at step S104. The device 4 is shipped after the initializing processing at the production site as described above is completed.

<Provisioning Processing>

Figure 13:
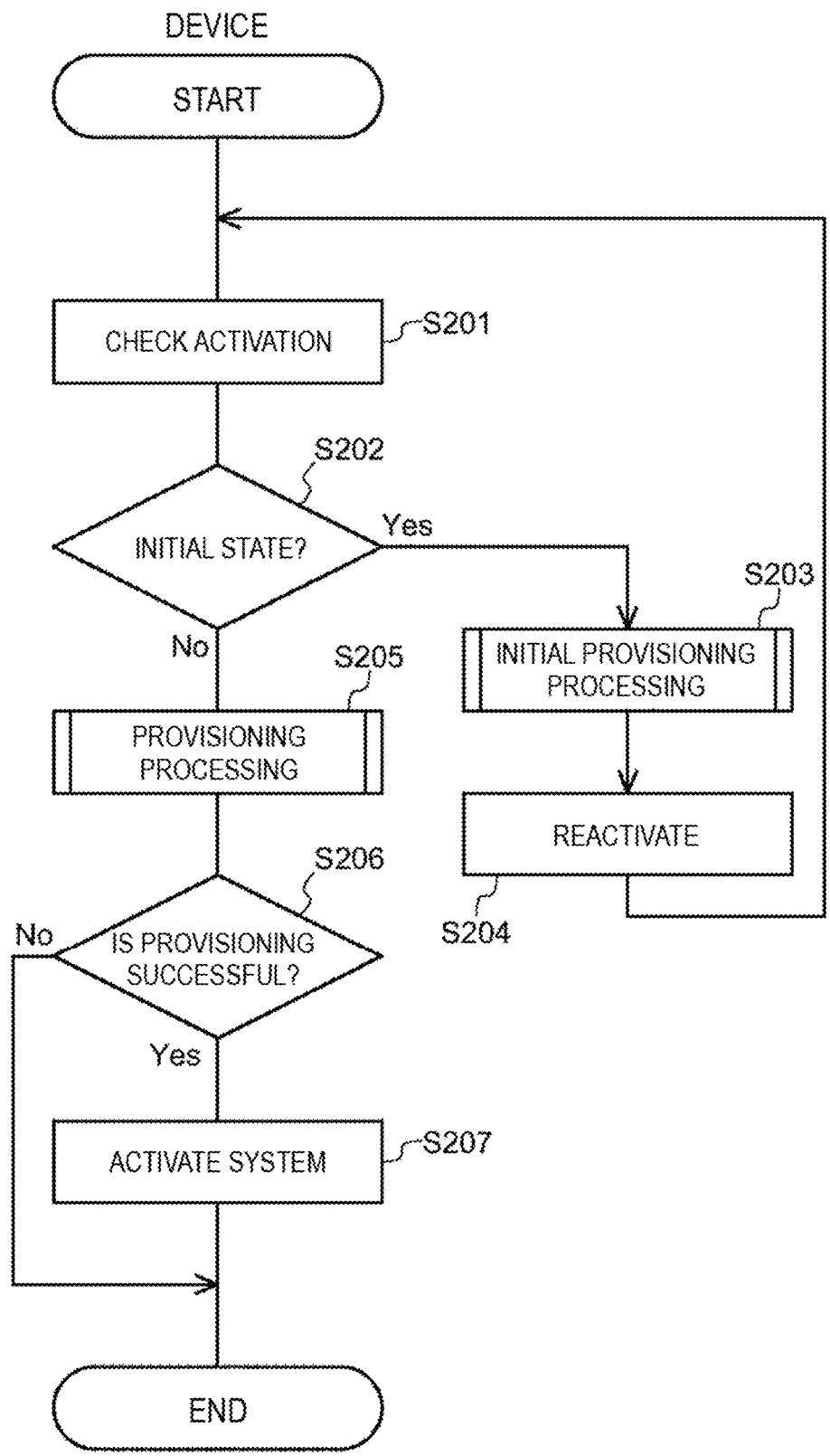
FIG. 13 is a flowchart illustrating the process of processing at device activation in the embodiment of the present invention.

FIG. 13 is a flowchart illustrating the process of processing at activation of the device 4. This processing is executed when the device 4 is turned on after work such as necessary connection with a power source, a network cable, and the like is performed.

First at step S201, activation of the device 4 is checked. At this step, processing necessary for each model of the device 4 is performed. For example, when the device 4 is connected with the network NW such as the Internet like the devices 4b1, 4b2, and 4b3, the necessary processing includes processing related to network connection, such as connection with a domain name system (DNS) server, gateway information setting, and IP address acquisition. When the device 4 is connected with a network different from the network NW like the devices 4a1, 4a2, and 4a3, network connection setting suitable for the kind of a network to be connected may be performed. In addition, processing in accordance with the device 4 may be performed such as check of whether the temperature where the device 4 is used (installed) or the like satisfies a condition under which the device 4 appropriately operates, and check of whether the device 4 has a configurational deficit (for example, hardware loss or failure) that cannot be solved by provisioning processing to be described later. When the activation check has failed, it is preferable that the failure of the activation check of the device 4 is notified by, for example, outputting a beep sound from a speaker included in the device 4 or performing display with a light emitting diode (LED), and then the device activation processing is ended.

After the activation check at step S201 is normally completed, it is determined at step S202 whether the device 4 is in the initial state. This determination can be performed by checking the status of data stored in the storage unit 45. Specifically, in the initial state of the device, the activation private key RA is included in the secure region 45a, and the device identification data ID is included in the normal region 45b, as illustrated in FIG. 7. In such a case, it is determined that the device 4 is in the initial state.

Figure 14:
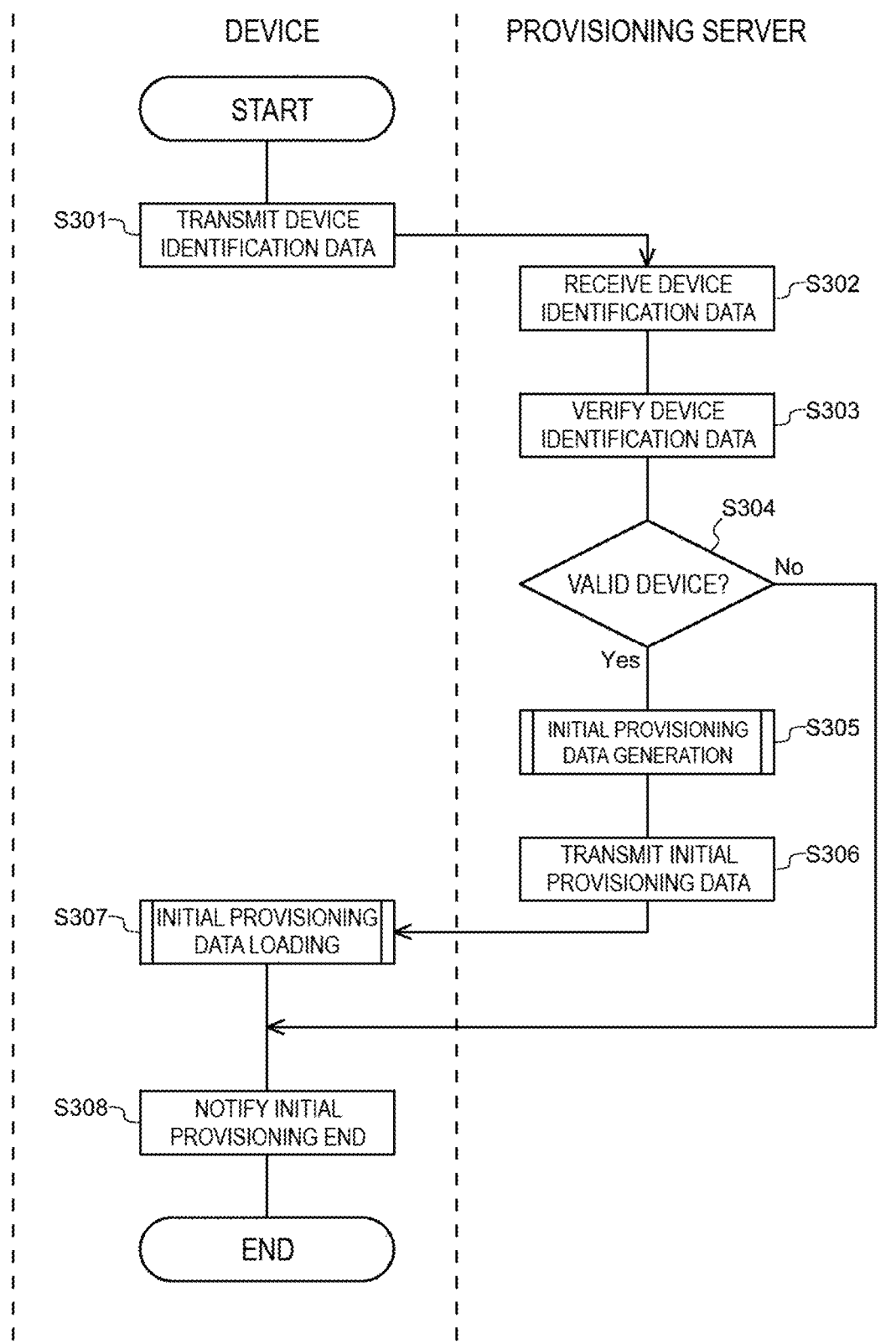
FIG. 14 is a flowchart illustrating the process of initial provisioning processing in the embodiment of the present invention.

When it is determined at step S202 that the device 4 is in the initial state, the process proceeds to step S203 to perform the initial provisioning processing of the device 4. FIG. 14 is a flowchart illustrating the process of the initial provisioning processing.

First at step S301, the device identification data ID stored in the normal region 45b is transmitted to the provisioning server 3 to request for providing initial provisioning data. Then, at step S302, the provisioning server 3 receives the request and starts processing of providing the initial provisioning data to the device 4.

At step S303, the provisioning server 3 performs verification processing on the device identification data ID received from the device 4. This verification can be performed by checking whether the activation public key UA included in the device identification data ID is stored in the device information storage unit 34. Specifically, decryption of the device identification data ID with the development private key, acquisition of an organization public key through a query using the organization trail to the public key providing means 13, and verification of the electronic signature SO based on the organization private key by using the organization public key are performed by using a development private key and an organization trail deployed at the provisioning server 3 in advance as described above. Then, it is checked whether the activation public key UA, the decryption and validity verification of which are completed is stored in the device information storage unit 34.

Since the device information storage unit 34 stores the activation public key UA recorded in the device information storage unit 52 at the initializing processing of the device 4 at the production site, the device 4 is assured to be a valid device initialized by the production site system 5 when a key identical to the activation public key UA taken out of the device identification data ID is stored in the device information storage unit 34. When information for uniquely identifying the device 4 is recorded in addition to the activation public key UA at the initializing processing of the device 4, the device identification data ID and information corresponding thereto are transmitted and used to additionally perform verification of the information at step S303, thereby more firmly assuring the device validity.

When the verification of the device identification data at step S303 is successful and the device 4 is determined to be valid, the process proceeds from step S304 to step S305 to perform generation processing of the initial provisioning data.

Figure 15:
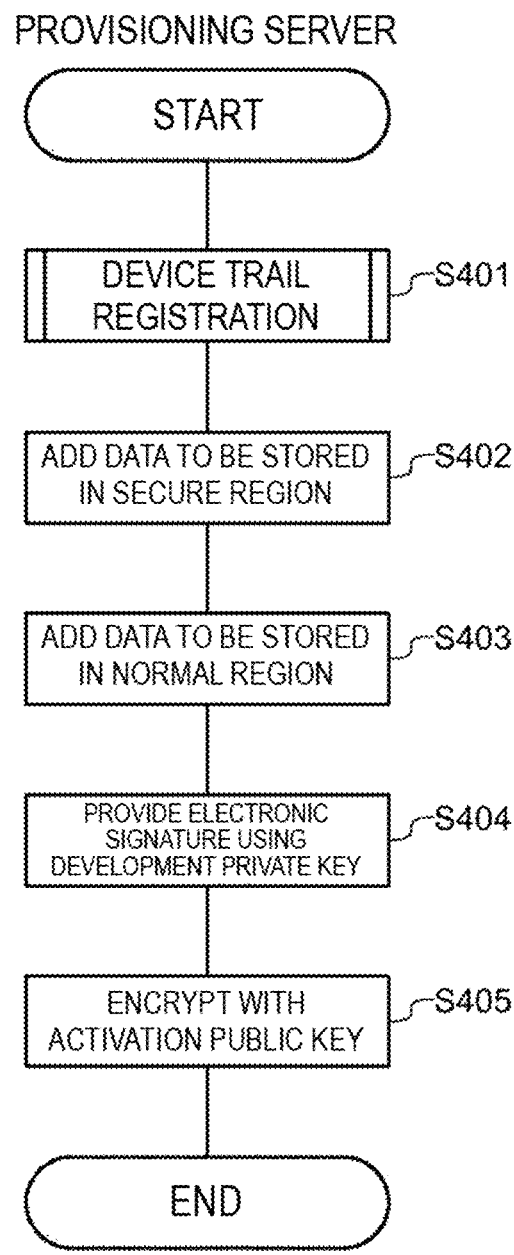
FIG. 15 is a flowchart illustrating the process of generation processing of the initial provisioning data in the embodiment of the present invention.
Figure 16:
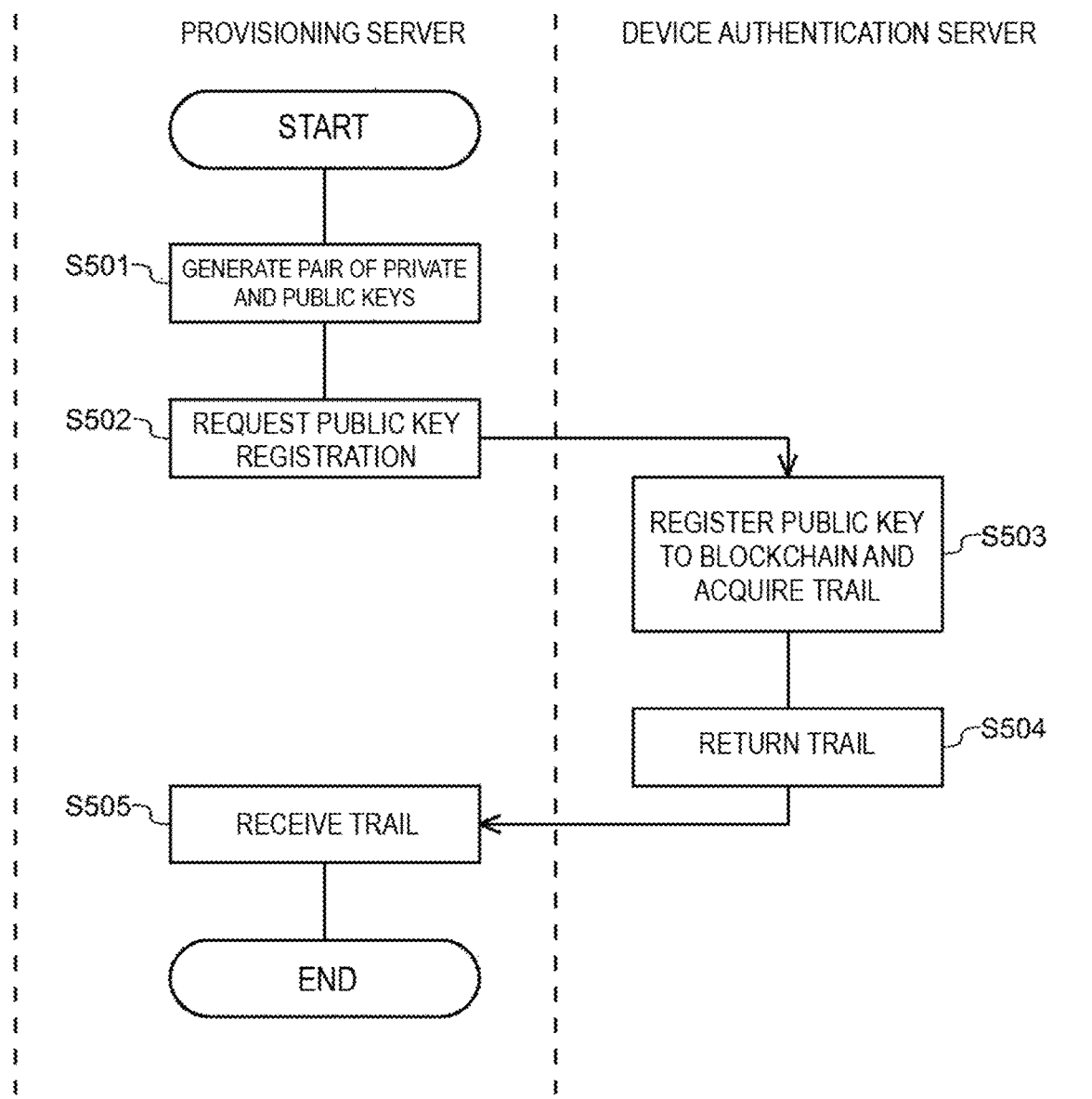
FIG. 16 is a flowchart illustrating the process of trail registration processing in the embodiment of the present invention.

FIG. 15 is a flowchart illustrating the process of the generation processing of the initial provisioning data by the provisioning data providing means 31. First at step S401, registration processing of a device trail to the blockchain 2 is performed by the device authentication server 1. The device trail is unique to each device 4 as described above, and corresponds to a device private key and a device public key unique to the device 4. FIG. 16 illustrates the process of the device trail registration processing.

In the device trail registration processing, first at step S501, the provisioning server 3 generates a pair of a device private key and a device public key corresponding thereto. Then, at step S502, registration of the device public key to the blockchain 2 is requested for the device authentication server 1.

Then, at step S503, the device trail is acquired through registration of the device public key to the blockchain 2 by the trail registration means 11 and returned to the provisioning server 3 at step S504. At step S505, the provisioning server 3 receives the device trail, and thus obtains the device private key generated at step S501 and the device trail.

Figure 10:
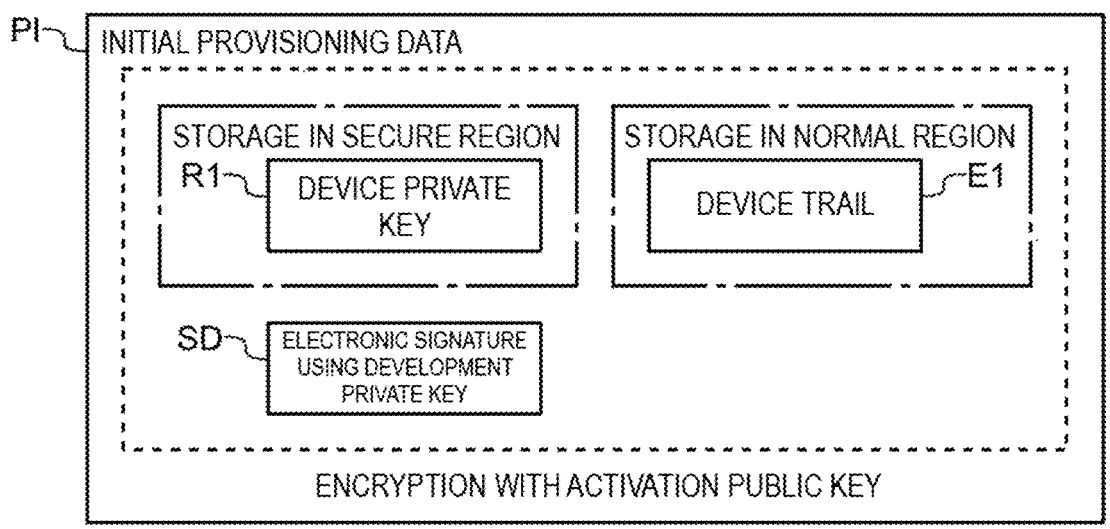
FIG. 10 is a diagram illustrating the structure of initial provisioning data according to the embodiment of the present invention.

After the device trail registration is completed through the above-described processing, data stored in the secure region 45a is added to the initial provisioning data at step S402. FIG. 10 illustrates the structure of initial provisioning data PI. As illustrated in FIG. 10, data stored in the secure region 45a is a device private key R1 acquired at step S401, and thus the key is added to the initial provisioning data.

Subsequently at step S403, the data to be stored in the normal region 45b is added to the initial provisioning data. In this example, as illustrated in FIG. 10, a device trail E1 acquired at step S401 is the data to be stored in the normal region and thus added to the initial provisioning data.

Then, at step S404, an electronic signature SD based on the development private key owned by the provisioning server 3 is provided. This may be performed through, for example, processing of calculating the hash value of the data added to the initial provisioning data so far and encrypting the hash value with the development private key. The development private key is deployed at the provisioning server 3 in advance as described above.

Thereafter, at step S405, the device private key R1, the device trail E1, and the electronic signature SD based on the development private key, which are added to the initial provisioning data so far, are encrypted with the activation public key taken out of the device identification data ID. This completes the initial provisioning data generation.

In this manner, after the encryption with the activation public key, the device identification data ID is transmitted to the device 4 having the activation private key corresponding thereto, in other words, the provisioning server 3 to configure the initial provisioning data to be loaded only at the device 4 that has requested provision of the initial provisioning data.

After the initial provisioning data generation processing at step S305 is completed as described above, the initial provisioning data is transmitted from the provisioning server 3 to the device 4 at step S306. Then, at step S307, the initial provisioning data is received and loaded.

The transmitted initial provisioning data is encrypted with the activation public key unique to each device as described above. Thus, when the initial provisioning data is fraudulently acquired by a device other than the device 4 having the activation private key corresponding to the activation public key, the initial provisioning data cannot be decrypted by the device. Thus, the transmission of the initial provisioning data from the provisioning server 3 to the device 4 can use not a communication protocol such as the hypertext transfer protocol secure (HTTPS), which needs a processing cost to achieve security, but a relatively lightweight communication protocol such as the normal hypertext transfer protocol (HTTP).

Figure 17:
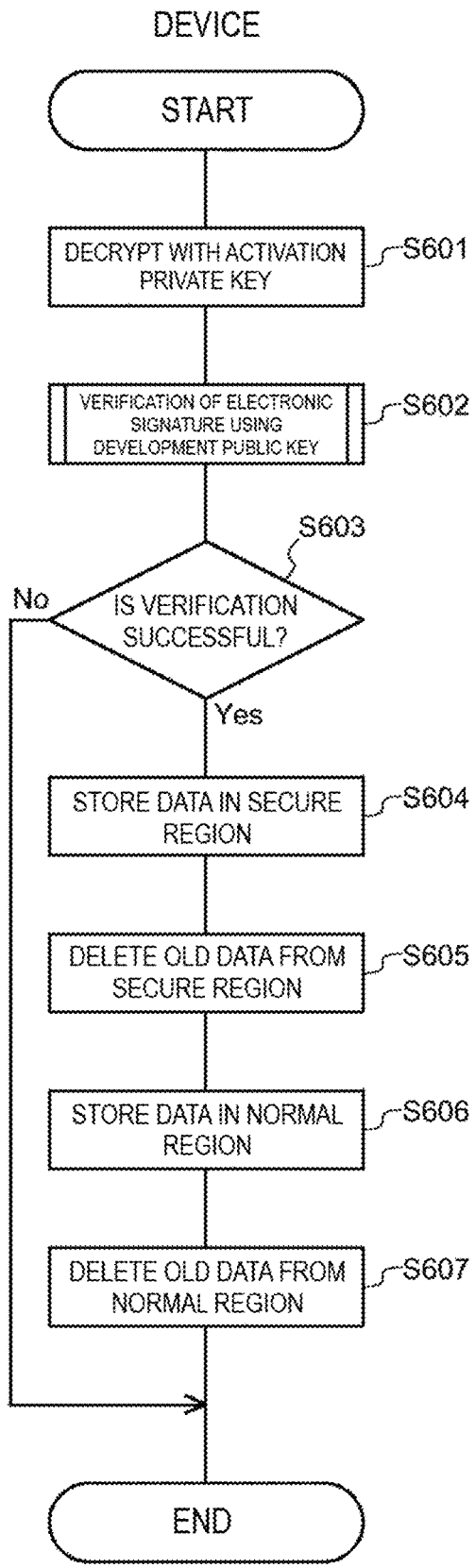
FIG. 17 is a flowchart illustrating the process of loading processing of the initial provisioning data in the embodiment of the present invention.

FIG. 17 illustrates the process of initial provisioning data loading processing by the device 4. First, at step S601, initial provisioning data is decrypted with an activation private key.

Figure 18:
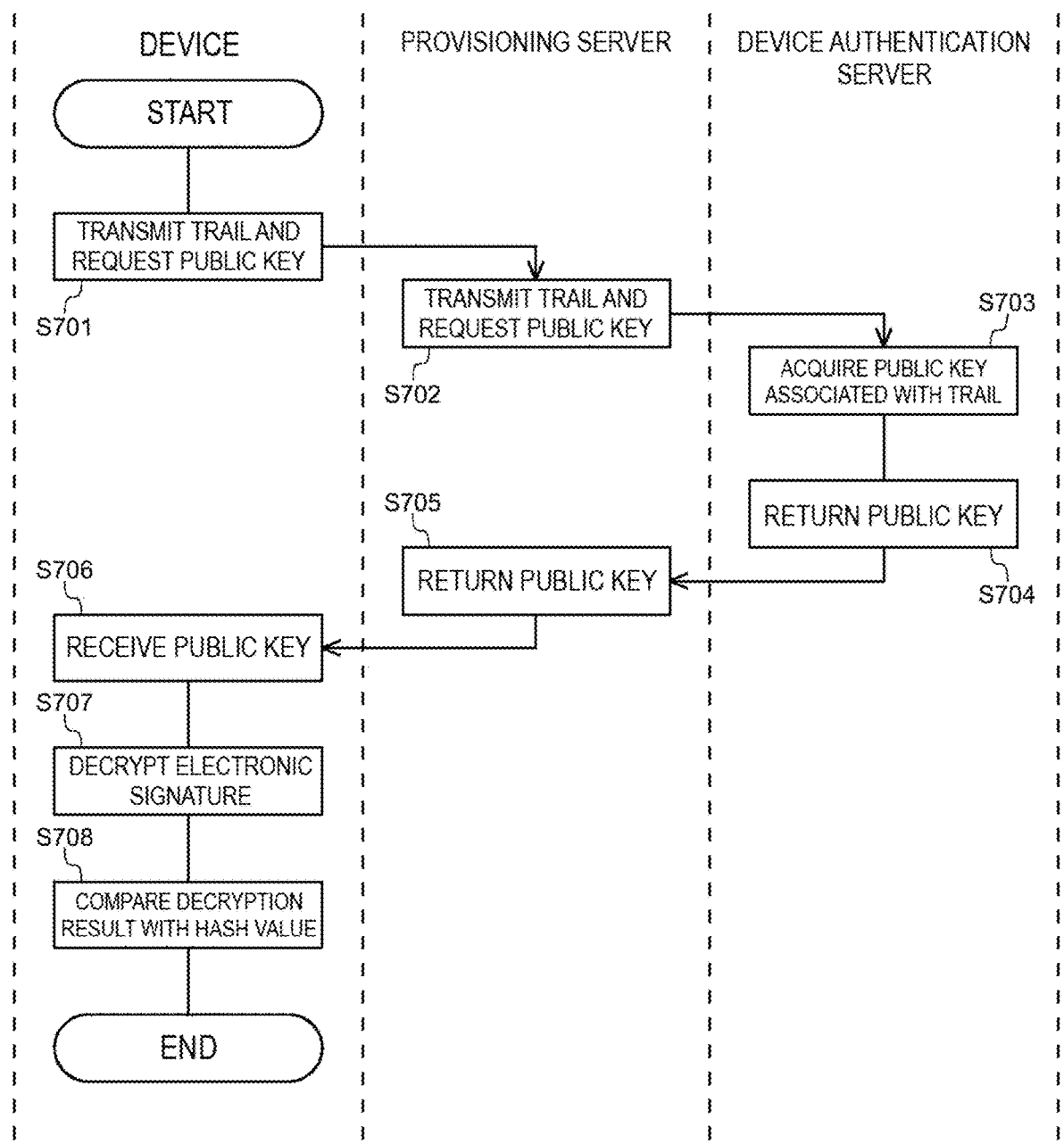
FIG. 18 is a flowchart illustrating the process of electronic signature verification processing in the embodiment of the present invention.

Subsequently at step S602, verification processing of the electronic signature SD based on the development private key is performed. FIG. 18 illustrates the process of the electronic signature verification processing by the device 4. First, at step S701, a request of a public key needed for electronic signature verification to the provisioning server 3 is performed through transmission of a trail corresponding thereto. In this case, it is intended to verify the electronic signature SD based on the development private key, which requires a development public key, and thus the development trail ED stored in the normal region 45b is transmitted.

The development public key acquisition request transmitted from the device 4 to the provisioning server 3 at step S701 is transmitted from the provisioning server 3 to the public key providing means 13 at step S702. At step S703, the public key providing means 13 refers to the blockchain 2 and acquires a development public key registered on the blockchain 2 in association with the received development trail.

The development public key acquired from the blockchain 2 at step S703 is returned to the provisioning server 3 at step S704 and further returned from the provisioning server 3 to the device 4 at step S705. The device 4 receives the development public key at step S706.

At step S707, the electronic signature SD based on the development private key is decrypted with the development public key received at step S706. As described above, the electronic signature SD based on the development private key is obtained by encrypting, with the development private key, the hash values of the device private key R1 and the device trail E1 included in the initial provisioning data PI. Thus, it can be determined that unauthorized falsification or the like of the initial provisioning data PI is not performed when the hash value of the data is calculated and a result of the calculation matches with a result of the decryption of the electronic signature SD based on the development private key.

In the device provisioning system according to the present embodiment, the reliability of a public key corresponding to a trail is assured through registration of the trail on the blockchain 2 as described above. Thus, a public key, the validity of which is assured can be obtained through a query using a trail without performing, on the device 4, cumbersome processing such as check of the issuer of an electronic certificate, acquisition of a public key of the issuer, and verification of the electronic signature of the issuer included in the electronic certificate, which has been performed in conventional cases to assure the validity of the public key based on the electronic certificate.

In this manner, when initial provisioning data is provided with an electronic signature based on a development private key and the electronic signature is verified at the device 4, it is possible to determine unauthorized provisioning data provided to the device 4 from an unauthorized server pretending the provisioning server 3.

When the electronic signature based on the development public key at step S602 is verified through the above-described processing and the verification is successful, the process proceeds from step S603 to step S604 and stores data in the secure region 45a. In this example, the initial provisioning data PI includes the device private key R1 as data to be stored in the secure region 45a, and thus the device private key R1 is stored in the secure region 45a.

At step S605, old data in the secure region 45a is deleted. Since, as illustrated in FIG. 7, the secure region 45a includes the activation private key RA as data older than the device private key R1 stored at step S604, the activation private key RA is deleted. In this process, data that has become unnecessary upon the data storage at step S604 needs to be deleted, and such data may be defined in advance or an instruction on data to be deleted may be included in the initial provisioning data PI.

Subsequently at step S606, data is stored in the normal region 45b. In this example, the initial provisioning data PI includes the device trail E1 as data to be stored in the normal region 45b, and thus the device trail E1 is stored in the normal region 45b.

Then, at step S607, old data in the normal region 45b is deleted. Since the normal region 45b includes the device identification data ID as illustrated in FIG. 7, the device identification data ID is deleted. Similarly to the data deletion from the secure region 45a at step S605, data that has become unnecessary upon the data storage at step S606 may be defined in advance or an instruction on data to be deleted may be included in the initial provisioning data PI.

After the loading processing of the initial provisioning data PI on the device 4 is completed in this manner, the storage unit 45 includes data as illustrated in FIG. 8(a). Specifically, the secure region 45a includes the device private key R1, which is included in the initial provisioning data PI, and the normal region 45b includes the device trail E1, which is included in the initial provisioning data PI, and the development trail ED and the organization trail EO included in the initial state of the device.

When the verification of the electronic signature by using the development public key at step S602 has failed, it is determined that there is a risk that the initial provisioning data PI is provided with unauthorized falsification or a risk that loading of the initial provisioning data PI for another device 4 is performed, in other words, data that is not the initial provisioning data PI valid for the device 4 as the target of the initial provisioning processing is about to be used. Thus, when the verification of the electronic signature has failed, the processing ends after step S603 and stops loading of the initial provisioning data PI.

After the loading processing of the initial provisioning data at step S307 is completed as described above, the end of the initial provisioning processing is notified at step S308. The notification is performed by transmitting, from the device 4 to the provisioning server 3, information on normal completion of the initial provisioning of the device 4, or when any processing has failed, information such as the cause of the failure. Having received such information, the provisioning server 3 transmits the information to the device authentication server 1 and performs writing to the blockchain 2. In this case, it is preferable to also handle additional information such as the time and place of the device activation processing.

In the initial provisioning processing of the device 4, it is particularly important to register, to the blockchain 2, a device trail unique to each device 4. In other words, the device 4 in the device provisioning system according to the present embodiment is registered to the blockchain 2 and managed. This can prevent mixture of, into the system, a device with unknown background such as what is called an unknown IoT device, thereby establishing the secure system.

After the initial provisioning processing of the device 4 at step S203 is completed through the processing as described above, reactivation of the device 4 is instructed at step S204. After the reactivation, the activation check processing at step S201 is performed again, and then, at step S202, it is checked whether the device 4 is in the initial state.

When the initial provisioning processing is normally completed, the storage unit 45 has a data structure as illustrated in FIG. 8(a) as described above. Thus, for example, the existence of the device private key R1 in the secure region 45a and the existence of the device trail E1 in the normal region 45b are checked, and when these pieces of data exist, it is determined that the device 4 is not in the initial state, and the provisioning processing at step S205 is executed.

Figure 19:
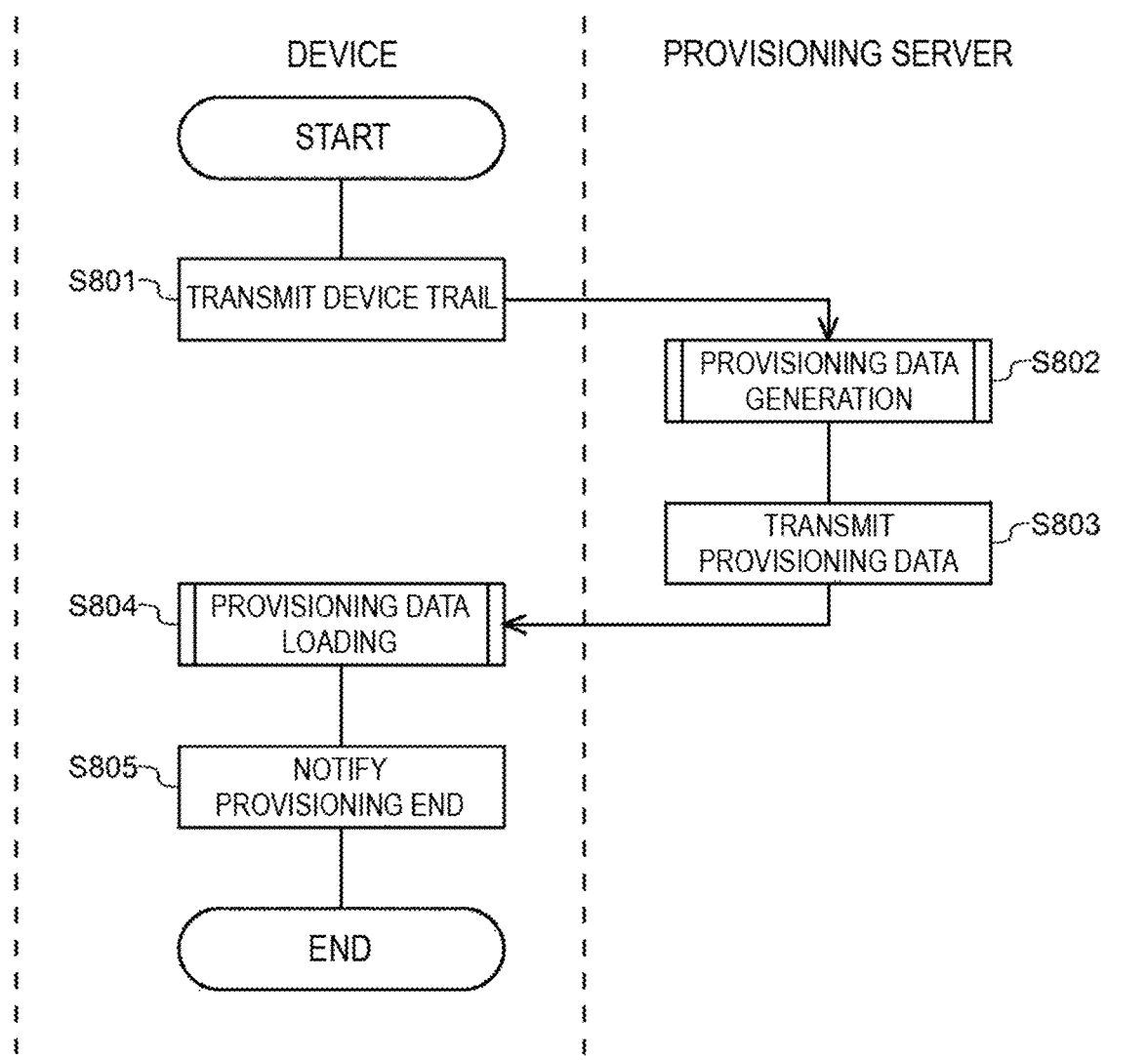
FIG. 19 is a flowchart illustrating the process of provisioning processing in the embodiment of the present invention.

FIG. 19 is a flowchart illustrating the process of provisioning processing of the device 4. In the provisioning processing of the device 4, first at step S801, a device trail is transmitted from the device 4 to the provisioning server 3, and provision of provisioning data is requested.

Figure 20:
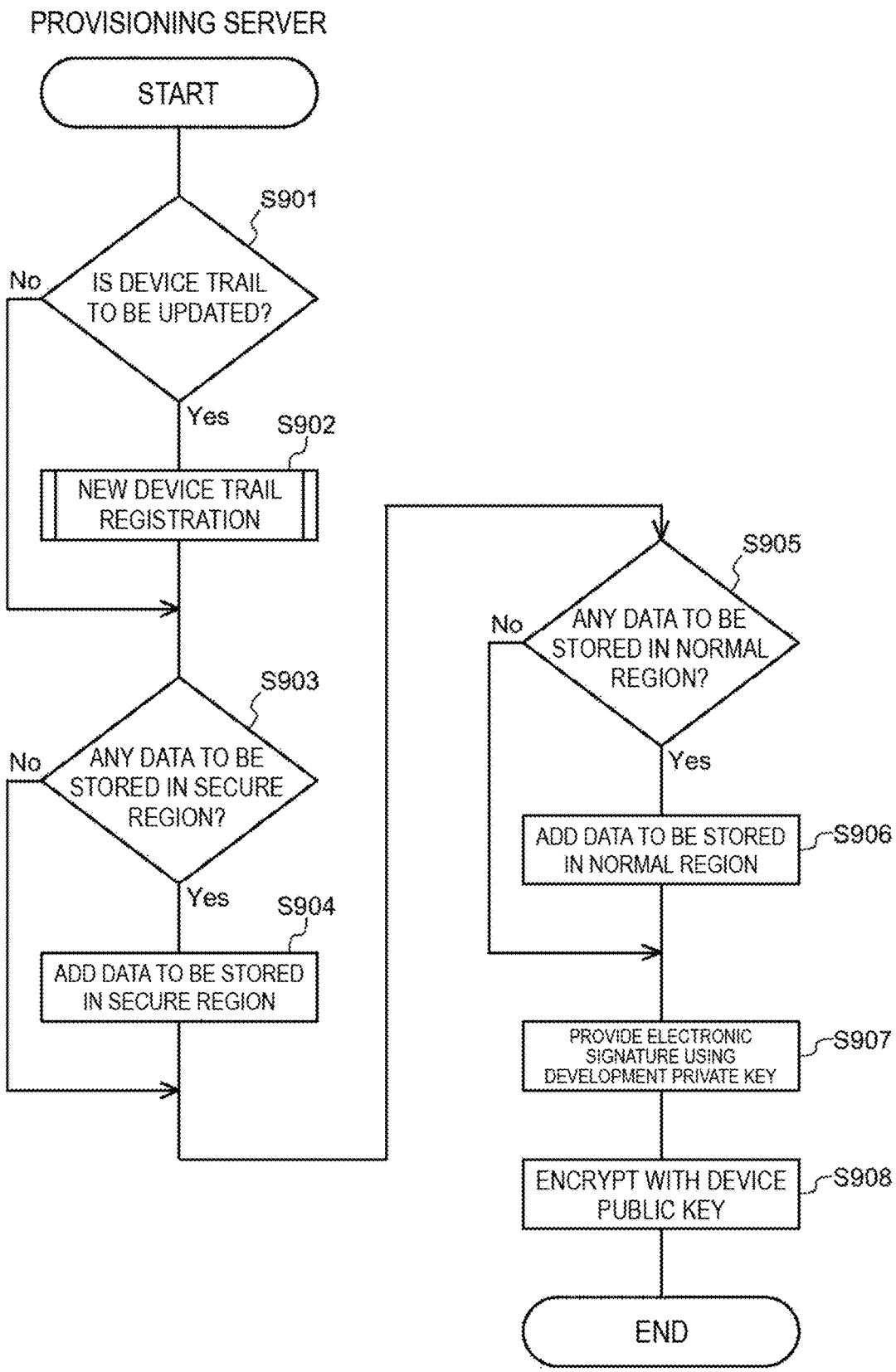
FIG. 20 is a flowchart illustrating the process of generation processing of the provisioning data in the embodiment of the present invention.

At step S802, the provisioning data providing means 31 performs generation processing of provisioning data based on the device trail received from the device 4. FIG. 20 illustrates the process of the provisioning data generation processing.

First, at step S901, it is determined whether the device trail needs to be updated. This can be achieved, for example, by setting an expire date to the device trail in advance and determining the need for update based on the expire date, or by determining whether to update the device trail at an optional timing, for example, by determining the need for update based on an instruction from the administrator of the provisioning server 3. Setting an expire date to the device trail is equivalent to providing the expire date to a device private key and a device public key corresponding to the device trail.

When it is determined at step S901 that the device trail is to be updated, the process proceeds to step S902 to perform new device trail registration processing. This can be performed through processing similarly to the processing described above with reference to FIG. 16.

Subsequently at step S903, it is checked whether there is any data to be added to the secure region 45a. When there is data to be added, the data is added to the provisioning data at step S904. Examples of the data added to the secure region 45a include a new device private key generated at step S902.

At step S905, it is checked whether there is any data to be added to the normal region 45b. When there is data to be added, the data is added to the provisioning data at step S906. Examples of the data added to the normal region 45b include an activation program suitable for the device 4, which is stored in the activation program storage unit 33, and a new device trail registered at step S902.

Then, at step S907, the electronic signature SD based on the development private key owned by the provisioning server 3 is provided. This can be achieved by, for example, calculating the hash value of data added to the provisioning data so far and encrypting the hash value with the development private key.

Thereafter, at step S908, the data added to the initial provisioning data so far is encrypted with the device public key of the device 4 to be provided with the provisioning data, which completes the initial provisioning data generation. The device public key can be acquired through a query to the public key providing means 13 using the device trail transmitted from the device 4.

The encryption with the device public key allows the device trail to be transmitted to the device 4 having a device private key corresponding to the device public key, in other words, the provisioning server 3, and allows the provisioning data to be loaded only at the device 4 having requested provision of the provisioning data.

After the provisioning data generation at step S802 is completed through the processing as described above, the provisioning data is transmitted to the device 4 at step S803. At step S804, the device 4 receives and loads the provisioning data.

As described above, the transmitted provisioning data is encrypted with the device public key unique to each device, and thus cannot be decrypted when fraudulently acquired by a device other than the device 4 having the device private key corresponding to the device public key. Thus, similarly to the initial provisioning data transmission, the transmission can be performed by using a relatively lightweight communication protocol such as HTTP.

Figure 21:
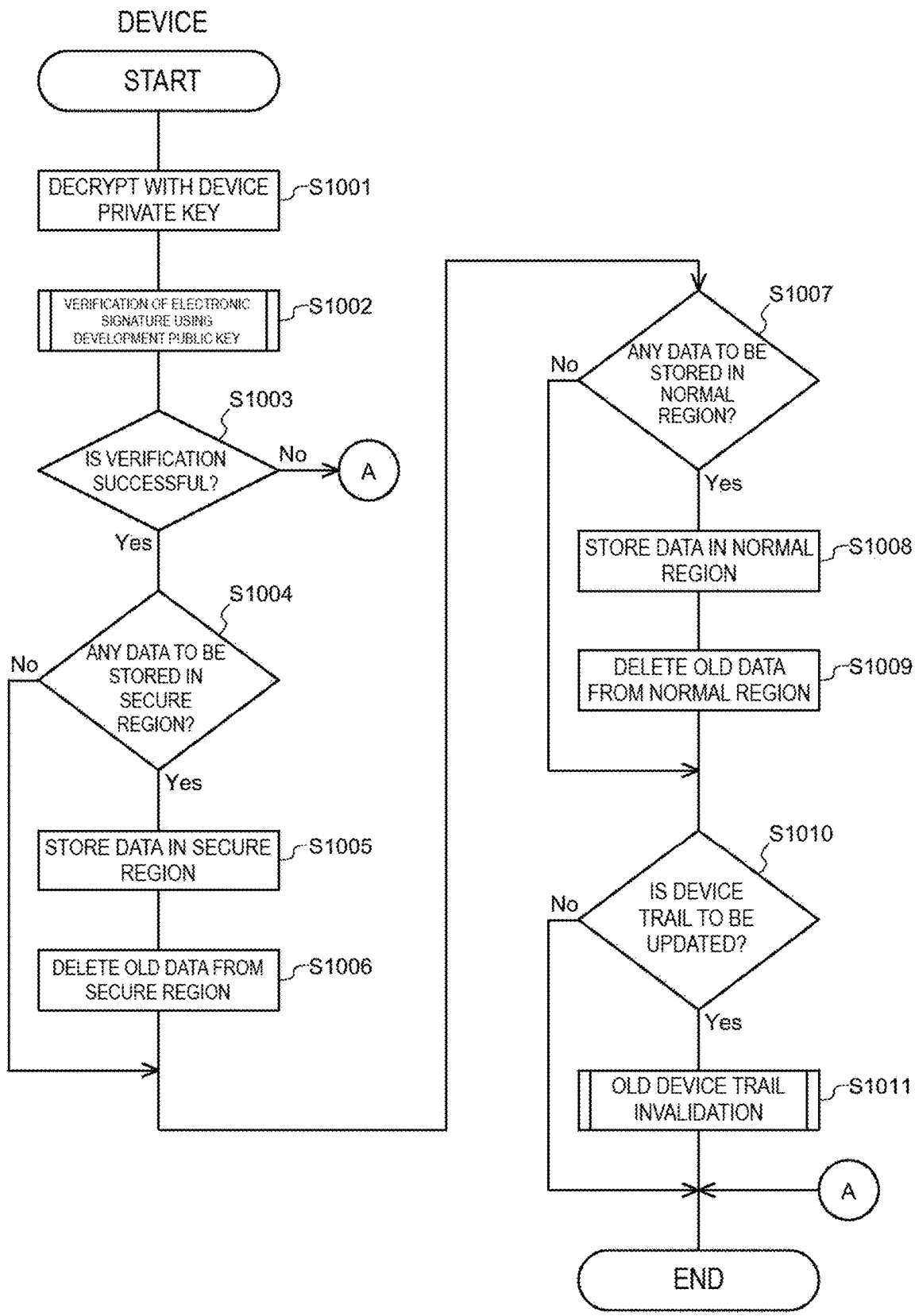
FIG. 21 is a flowchart illustrating the process of loading processing of the provisioning data in the embodiment of the present invention.

FIG. 21 illustrates the process of loading processing of the provisioning data by the device 4. First, at step S1001, the provisioning data is decrypted by the device private key.

Subsequently at step S1002, verification processing is performed on the electronic signature SD based on the development private key. This processing may be performed through the processing as described above with reference to FIG. 18. When the verification is successful, the processing proceeds from step S1003 to step S1004.

At step S1004, it is checked whether the provisioning data includes data to be stored in the secure region 45a. In this check, as described above for the provisioning data generation processing, for example, a new device private key for the device 4 is handled as the data to be stored in the secure region 45a.

When it is determined at step S1004 that there is data to be stored in the secure region 45a, the data is stored in the secure region 45a at step S1005. Then, at step S1006, old data corresponding to the data is deleted from the secure region 45a. For example, after a new device private key for the device 4 is stored in the secure region 45a, a currently used device private key is deleted.

At step S1007, it is checked whether the provisioning data includes data to be stored in the normal region 45b. In this check, as described above for the provisioning data generation processing, for example, an activation program suitable for the device 4 and a new device trail for the device 4 are handled as the data to be stored in the normal region 45b.

When it is determined at step S1007 that there is data to be stored in the normal region 45b, the data is stored in the normal region 45b at step S1008. Then, at step S1009, old data corresponding to the data is deleted from the normal region 45b. For example, when a previously acquired activation program is stored in the normal region 45b after a new activation program is stored, the previously acquired activation program is deleted, or after a new device trail for the device 4 is stored, a currently used device trail is deleted.

At step S1010, it is checked whether the device trail of the device 4 is updated, in other words, whether a new device private key is stored in the secure region 45a at step S1005 and a new device trail is stored in the normal region 45b at step S1008. When it is determined that the device trail is updated, the process proceeds to step S1011 to perform invalidation processing of an old device trail before the update.

Figure 22:
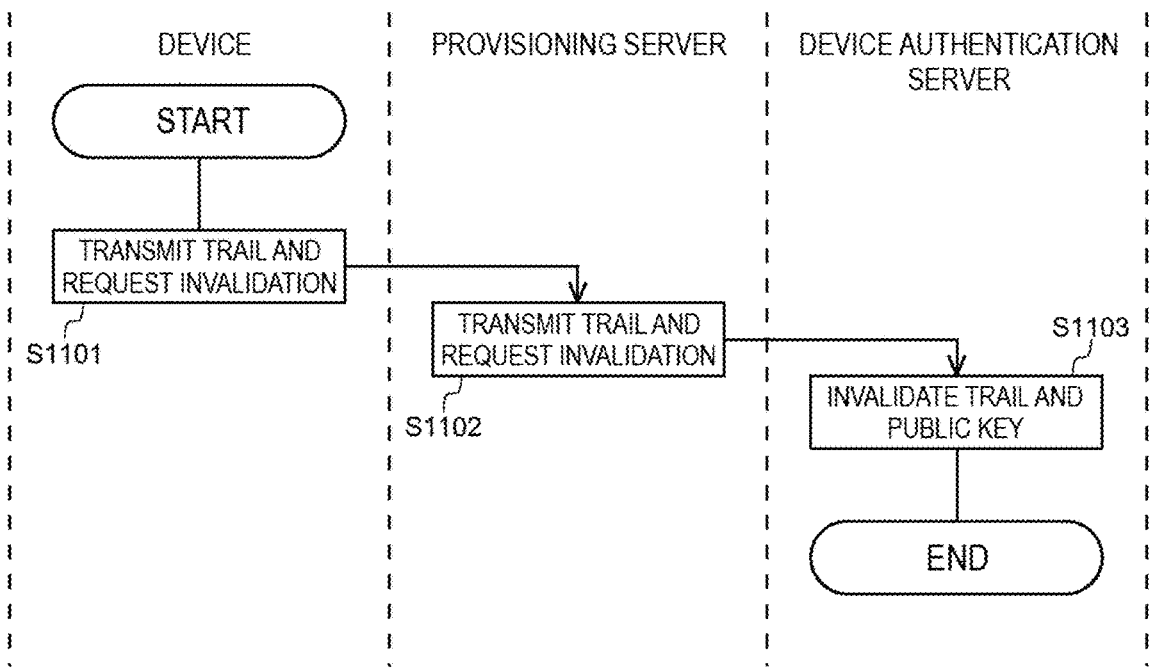
FIG. 22 is a flowchart illustrating the process of trail invalidation processing in in the embodiment of the present invention.

FIG. 22 illustrates the process of the device trail invalidation processing. First, at step S1101, the old device trail is transmitted from the device 4 to the provisioning server 3, and invalidation thereof is requested. At step S1102, the provisioning server 3 receives the old device trail and transmits the old device trail to the device authentication server 1.

At step S1103, the device authentication server 1 receives the old device trail transmitted from the device 4 through the provisioning server 3 and performs the invalidation processing on the blockchain 2. As described above, it is impossible to delete or modify a block generated once on the blockchain 2. Thus, the old device trail is invalidated on the blockchain 2 through processing such as registration of a new trail instructing the invalidation of the old device trail.

Through the processing as described above, the provisioning data loading processing at step S804 ends. In the provisioning processing, through the provisioning data generation processing described with reference to FIG. 20, data needed to be provided to the device 4 may be added, as data to be stored in the secure region 45a and data to be stored in the normal region 45b, to the provisioning data as appropriate, and the device 4 having received the data may perform the provisioning data loading processing as illustrated in FIG. 21 in accordance with the contents of the data.

Figure 11:
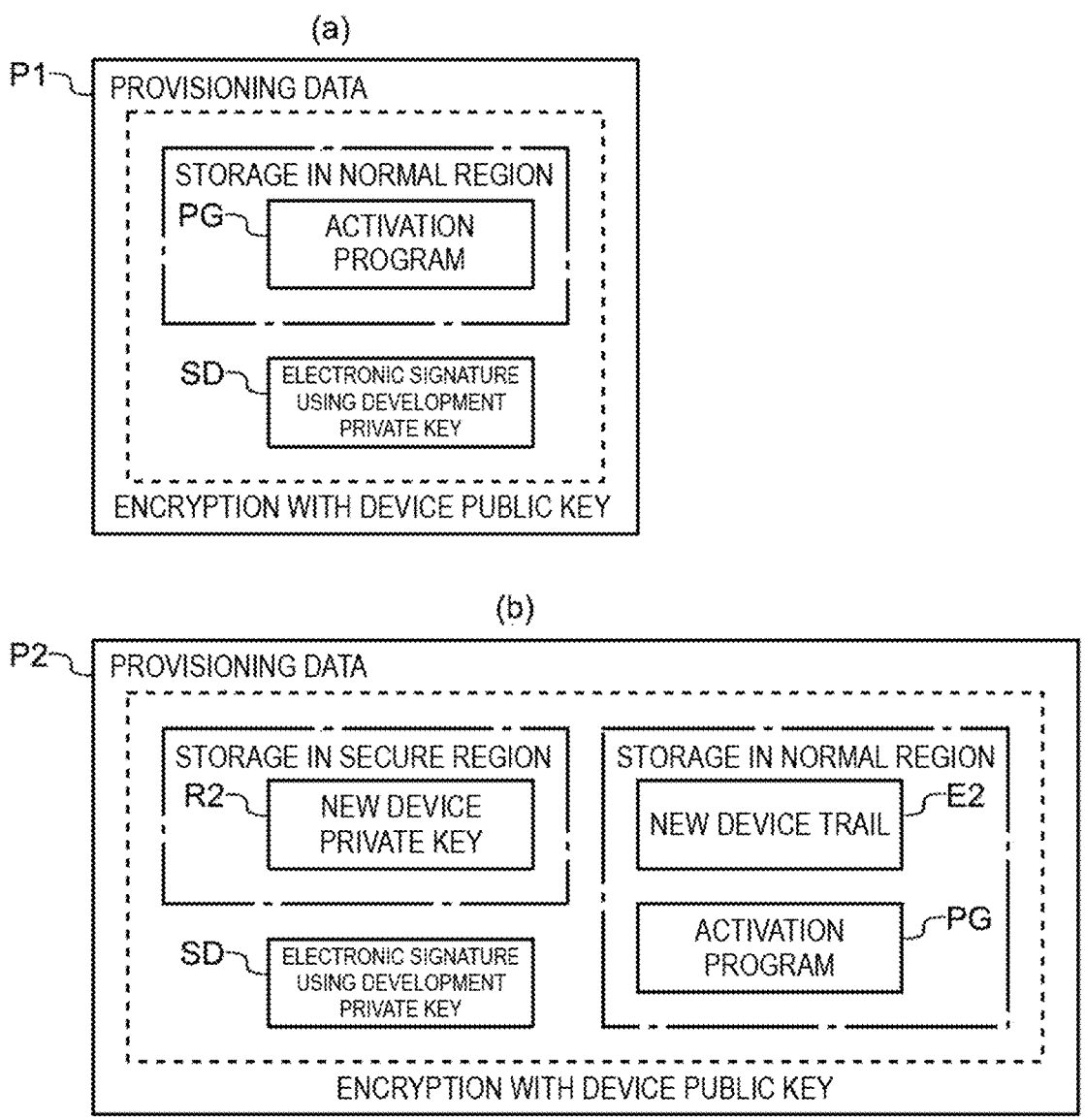
FIG. 11 is a diagram illustrating exemplary provisioning data according to the embodiment of the present invention.

For example, when an activation program PG needs to be provided, a provisioning data P1 including the activation program PG, as illustrated in FIG. 11(a), is generated as data to be stored in the normal region 45b, and is provided to the device 4. Having received the data, the device 4 stores the activation program PG in the normal region 45b after decryption and electronic signature verification, and when there is an activation program stored in the normal region 45b in the previous provisioning processing, the device 4 deletes the activation program.

When a device trail is to be updated, in addition to the activation program PG, provisioning data P2 as illustrated in FIG. 11(b) is generated which includes a new device private key R2 as data to be stored in the secure region 45a and includes, as data to be stored in the normal region 45b, a new device trail E2 in addition to the activation program PG, and then the provisioning data P2 is provided to the device 4. Having received the data, the device 4 performs, after decryption and electronic signature verification, storage of the new device private key R2 in the secure region 45a, deletion of a currently used device private key from the secure region 45a, storage of the new device trail E2 and the activation program PG in the normal region 45b, and deletion of a currently used device trail and an activation program stored in the normal region 45b in the previous provisioning processing.

In the device provisioning system according to the present embodiment, the device 4 is registered to the blockchain 2 and managed as described above. Thus, updating a device trail registered to the blockchain 2 is equivalent to updating registration of the device 4 in the device provisioning system.

Then, the end of the provisioning processing is notified at step S805. The notification is performed by transmitting, from the device 4 to the provisioning server 3, information on normal completion of the provisioning of the device 4, or when any processing has failed, information such as the cause of the failure. Having received such information, the provisioning server 3 transmits the information to the device authentication server 1 and performs writing to the blockchain 2. In this case, it is preferable to also handle additional information such as the time and place of the device activation processing.

After the provisioning processing at step S205 is normally completed as described above, as illustrated in FIG. 8(b), the storage unit 45 includes the device private key R1 in the secure region 45a, and includes the device trail E1, the activation program PG, the development trail ED, and the organization trail EO in the normal region 45b.

At step S206, whether the provisioning is successful is determined based on the contents of the provisioning processing end notification at step S805 and the state of data included in the storage unit 45. When the provisioning has normally ended, the device 4 is prepared to be activated through a legitimate procedure, and thus the process proceeds to step S207 to perform system activation by the system activation means 43. In this case, for example, as described above, when the activation program PG includes an OS that operates on the device 4, the device 4 may be activated by using the activation program PG, or when the activation program PG is a computer program for calling an OS, the device 4 may be activated by an OS stored in the auxiliary storage device of the device 4 in advance. Alternatively, part or all of the device private key R1, the device trail E1, the development trail ED, and the organization trail EO may be passed so that they can be used on an OS.

After the system activation at step S207, an OS or an application program operates on the device 4. These logs or the like are preferably accumulated in a storage unit (not illustrated) provided on the provisioning server 3. Specifically, for example, when the device 4 is an IoT device intended for data collection or the like, collection target data is accumulated. In this manner, the accumulation may be performed in accordance with usage of the device 4.

<Device Reinitialization Processing>

Figure 24:
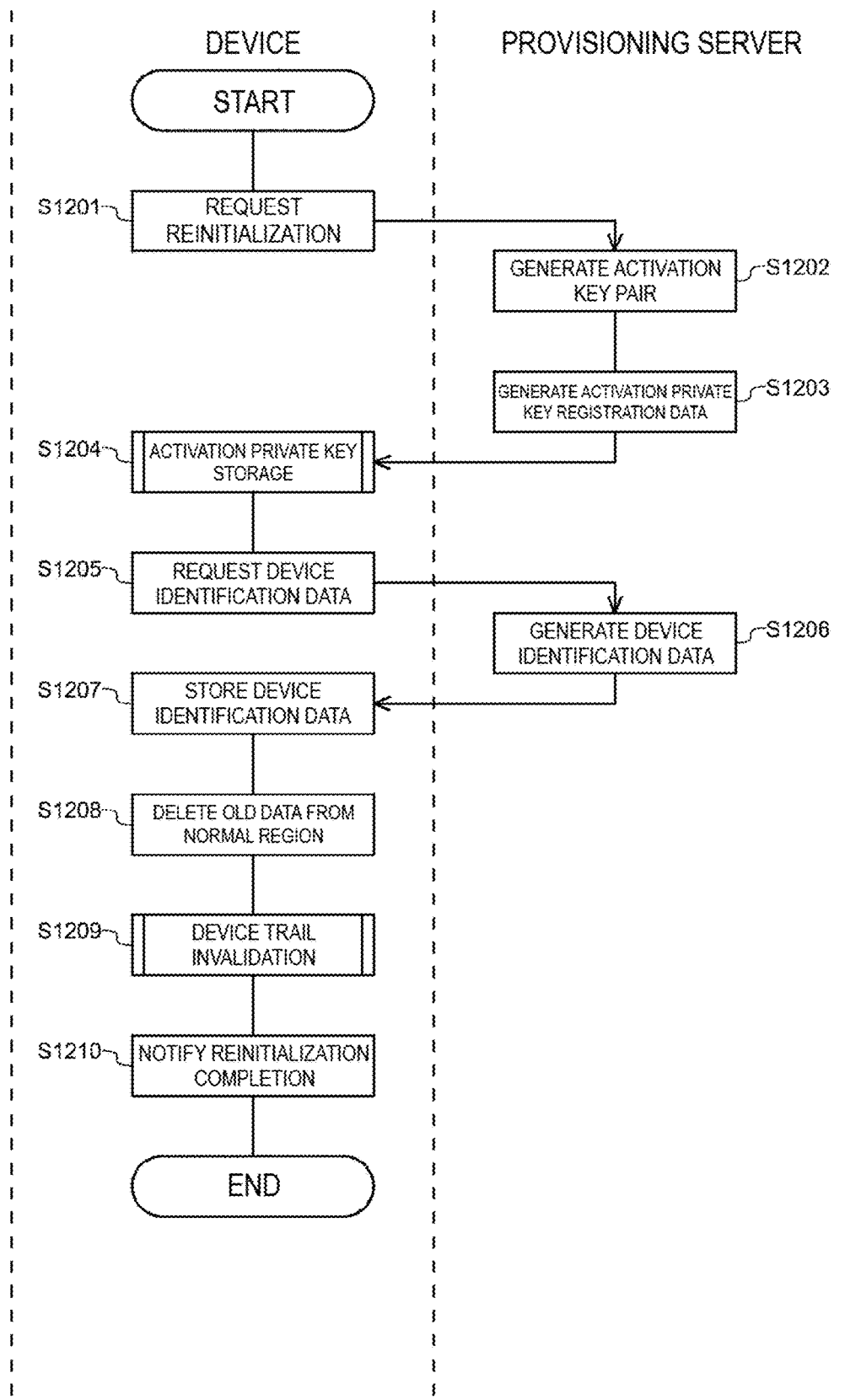
FIG. 24 is a flowchart illustrating the process of device reinitialization processing in the embodiment of the present invention.

FIG. 24 is a flowchart illustrating the process of reinitialization processing of the device 4. This is executed upon reception of an operation instructing the reinitialization processing of the device 4, for example, when failure has occurred to the device or when use of the device is stopped. The instruction operation may be an optionally determined operation such as a press of a dedicated button provided to the device 4 or a long press of a button for turning on the device 4.

First, at step S1201, the device 4 having received the instruction for the reinitialization processing as described above requests the reinitialization processing to the provisioning server 3. In this case, the device 4 transmits, to the provisioning server 3, the device trail of the device 4 stored in the secure region 45*a* as information for specifying the device 4.

The provisioning server 3 receives the reinitialization request at step S1202 and generates an activation key pair by the activation key providing means 32*b*. The activation key pair includes an activation private key unique to each device 4 and an activation public key corresponding thereto, similarly to the activation key pair generated at step S102 in the initializing processing at manufacturing of the device 4.

Figure 23:
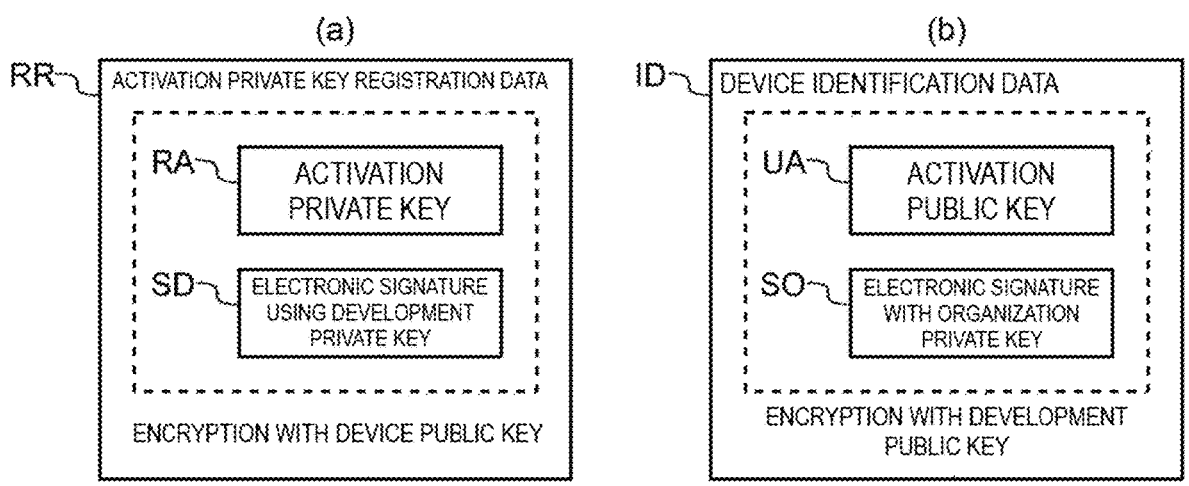
FIG. 23 is a diagram illustrating the structure of data used for device reinitialization in the embodiment of the present invention.

Then, at step S1203, activation private key registration data RR for registering the activation private key RA generated at step S1202, as illustrated in FIG. 23(*a*), to the device 4 is generated.

In this generation, first, the electronic signature SD based on a development private key is provided. This is performed through processing such as calculating the hash value of the activation private key RA and encrypting the hash value with a development private key held by the provisioning server 3. Then, the activation private key RA and the electronic signature SD based on the development private key are encrypted with a device public key. The device public key is acquired through a query using the device trail received at step S1202 to the public key providing means 13.

Figure 25:
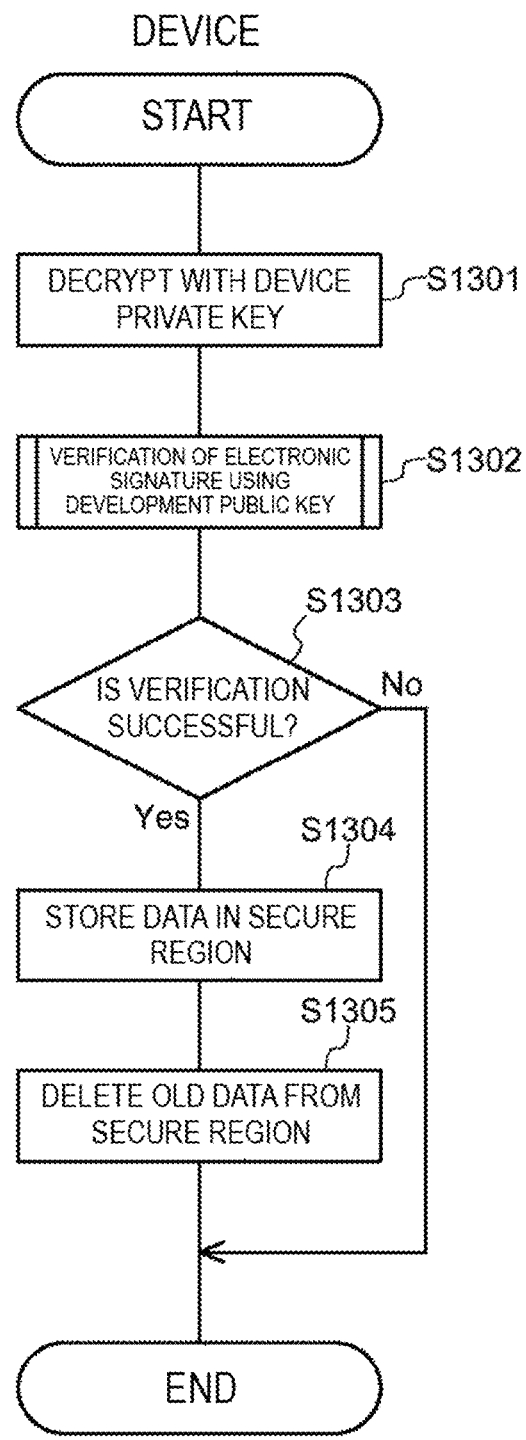
FIG. 25 is a flowchart illustrating the process of activation private key storage processing in the embodiment of the present invention.

After the generation of the activation private key registration data RR at step S1203 is completed as described above, the activation private key registration data RR is transmitted to the device 4. Then, at step S1204, the device 4 performs storage processing of the activation private key by using the received activation private key registration data RR. FIG. 25 illustrates the process of the activation private key storage processing.

First, at step S1301, the activation private key registration data RR is decrypted with the device private key of the device 4. Then, at step S1302, the electronic signature SD based on the development private key is verified by using the development public key. In this verification, the processing as described with reference to FIG. 18 may be performed by using the development trail stored in the normal region 45*b*.

Then, when the verification of the electronic signature SD based on the development private key is successful, in other words, when it is determined that the activation private key registration data RR is valid, the process proceeds from step S1303 to step S1304 to store the activation private key RA in the secure region 45*a*.

Thereafter, at step S1305, deletion of old data from the secure region 45*a*, in other words, deletion of the device private key in this example is performed, which ends the activation private key storage processing.

After the activation private key storage processing at step S1204 in this manner, the device 4 requests device identification data to the provisioning server 3 at step S1205.

Then, at step S1206, the provisioning server 3 performs generation processing of the device identification data ID as illustrated in FIG. 23(*b*). In this processing, first, the electronic signature SO based on an organization private key is provided. This is performed through processing such as calculating the hash value of the activation public key UA and encrypting the hash value with the organization private key held by the provisioning server 3. Then, the activation private key RA and the electronic signature SO based on the organization private key are encrypted with the development public key. The development public key is acquired through a query using a development trail deployed at the provisioning server 3 in advance to the public key providing means 13.

After the generation of the device identification data ID at step S1206 is completed as described above, the device identification data ID is transmitted to the device 4. Then, at step S1207, the device 4 stores the received device identification data ID in the normal region 45*b*.

Subsequently at step S1208, deletion of old data from the normal region 45*b*, in other words, deletion of a device trail and an activation program in this example is performed. Then, at step S1209, invalidation processing of a device trail stored on the blockchain 2 is performed. This can be performed through a request to the trail invalidation means 12 as described above with reference to FIG. 22.

In the device provisioning system according to the present embodiment, the device 4 is registered to the blockchain 2 and managed as described above. Thus, invalidating a device trail registered to the blockchain 2 is equivalent to canceling registration of the device 4 in the device provisioning system.

After the device trail invalidation processing at step S1209 is completed, the end of the reinitialization processing of the device 4 is notified at step S1210. This is performed by transmitting, from the device 4 to the provisioning server 3, information on normal completion of the reinitialization of the device 4, or when any processing has failed, information such as the cause of the failure. Having received such information, the provisioning server 3 transmits the information to the device authentication server 1 and performs writing to the blockchain 2. In this case, it is preferable to also handle additional information such as the time and place of the device reinitialization processing.

After the reinitialization of the device 4 is completed through the processing as described above, data in the storage unit 45 is in a state as illustrated in FIG. 7, similarly to that at completion of the initializing processing by the production site system 5 described with reference to FIG. 12. When the device 4 reinitialized in this manner is used again, the initial provisioning processing described with reference to, for example, FIGS. 13 and 14 is performed, and accordingly, registration onto the blockchain 2 is performed again.

<Provisioning Execution Using Instruction Data>

The provisioning processing and the reinitialization processing of the device 4 described above are executed at activation of the device 4. In the device provisioning system according to the present embodiment, in addition to these pieces of processing, the provisioning processing can be executed after completion of step S207 in the processing at activation of the device 4 described with reference to FIG. 13, in other words, when the OS or an application is operational on the device 4.

Figure 27:
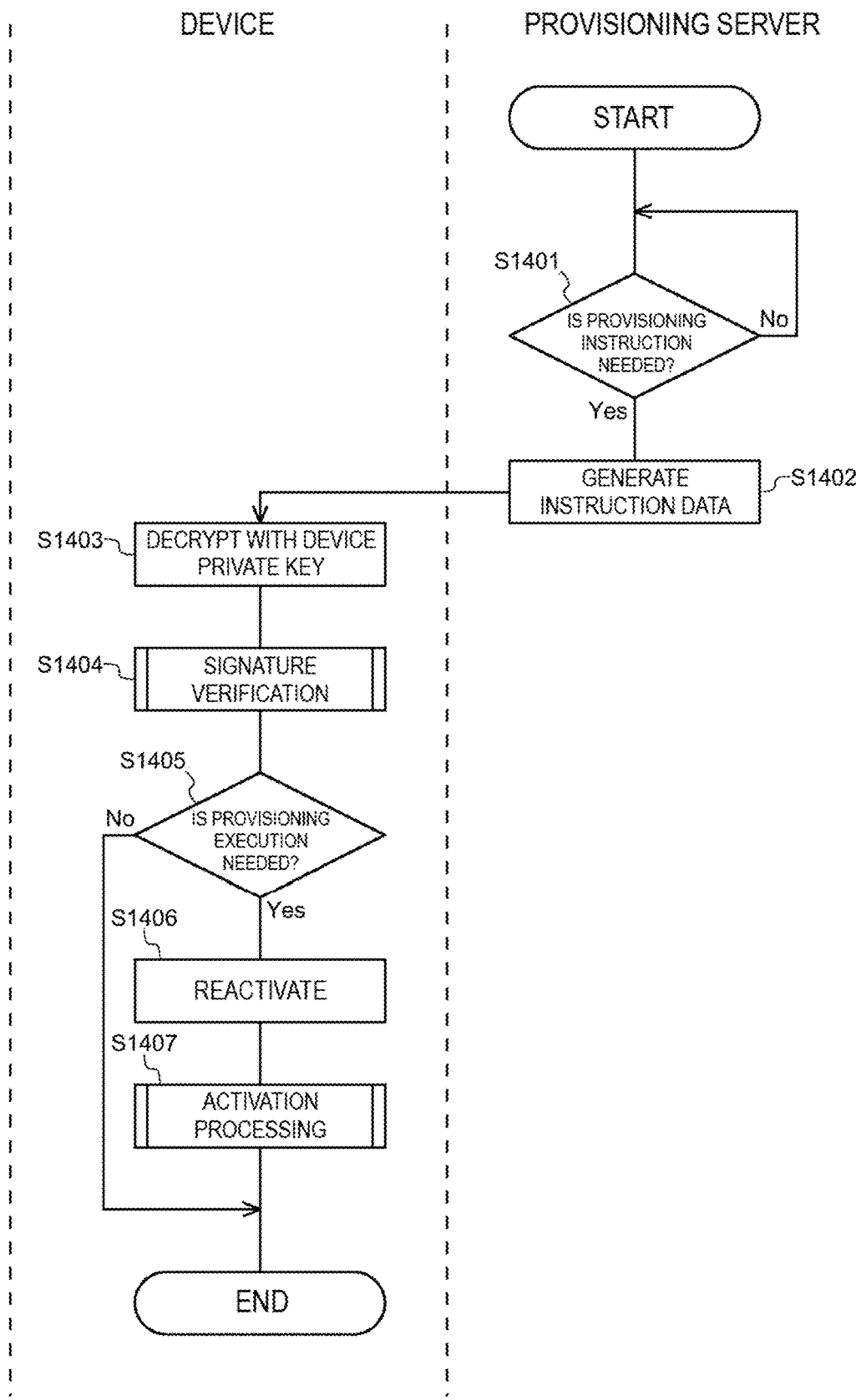
FIG. 27 is a flowchart illustrating the process of provisioning processing based on an instruction from a provisioning server in the embodiment of the present invention.

FIG. 27 is a flowchart illustrating the process of processing when the provisioning processing is performed on the device 4 in operation based on an instruction from the provisioning server 3. First, at step S1401, it is determined whether a provisioning instruction for the device 4 is needed, and waiting is performed until it is determined that the provisioning instruction is needed.

The criteria of the determination may be registered to the provisioning server 3 in advance. For example, the provisioning processing may be set to be performed in each predetermined duration, or the provisioning processing may be performed as needed through an operation on the provisioning server 3. In addition, a target device of the provisioning instruction can be preferably determined through preconfiguration or the like. For example, the target may be the device 4 on which a certain duration or more has elapsed since the previous provisioning processing. For example, when the device 4 is configured to transmit position information to the provisioning server 3, the target may be the device 4 in operation in an area included in a particular range.

Figure 26:
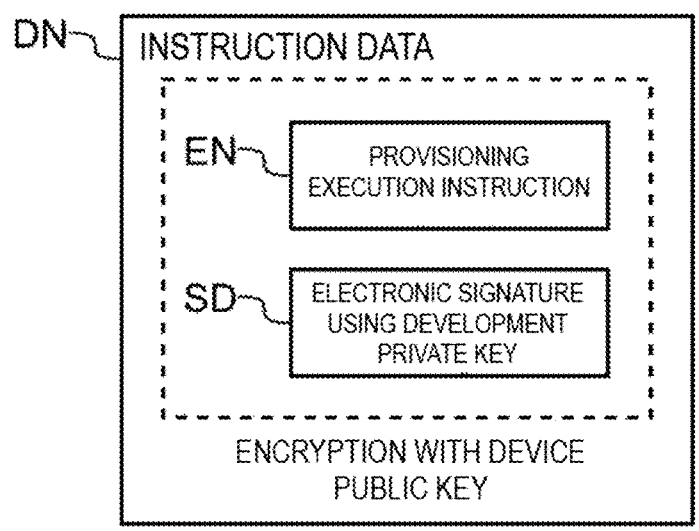
FIG. 26 is a diagram illustrating the structure of instruction data in the embodiment of the present invention.

Then, when it is determined at step S1401 that the provisioning instruction is needed, the process proceeds to step S1402 to perform generation of an instruction data DN as illustrated in FIG. 26. This is performed by processing such as providing a provisioning execution instruction EN with the electronic signature SD based on a development private key and performing encryption with a device public key. The device public key used here can be acquired through a query using the device trail of the target device 4 of the provisioning instruction to the public key providing means 13. To perform provisioning on an appropriate device by the provisioning server 3, the device trail of the device 4 registered by the provisioning server 3, in other words, the device 4 managed by the provisioning server 3 is preferably accumulated on the provisioning server 3 at registration of a device public key to the blockchain 2 and acquisition of the device trail through the processing described above with reference to FIG. 16.

Then, the instruction data DN generated at step S1402 is transmitted to the target device 4 of the provisioning instruction. Having received the instruction data DN, the device 4 decrypts the instruction data DN with a device private key stored in the secure region 45a at step S1403, and verifies the electronic signature SD based on the development private key included in the instruction data DN at step S1404. The verification processing of the electronic signature SD based on the development private key may be performed through processing as described above with reference to FIG. 18.

When the verification processing of the electronic signature SD based on the development private key at step S1404 is successful and it is checked that the normal provisioning execution instruction EN is included in the instruction data DN, the process proceeds from step S1405 to step S1406 to perform reactivation of the device 4. Then, at step S1407, the device activation processing as described above with reference to FIG. 13 is executed.

Through the processing as described above, the provisioning processing can be executed on the device 4 in operation based on an instruction from the provisioning server 3. Accordingly, as described above, the provisioning processing of the device 4 can be executed at the provisioning server 3 at an optional timing set in advance or based on an operation by the administrator or the like.

As described above, this is processing executed while the OS or the like is operational on the device 4. Specifically, processing from the reception of the instruction data DN at step S1403 to the reactivation at step S1406 may be executed by a service or the like in operation on the OS of the device 4.

Figure 28:
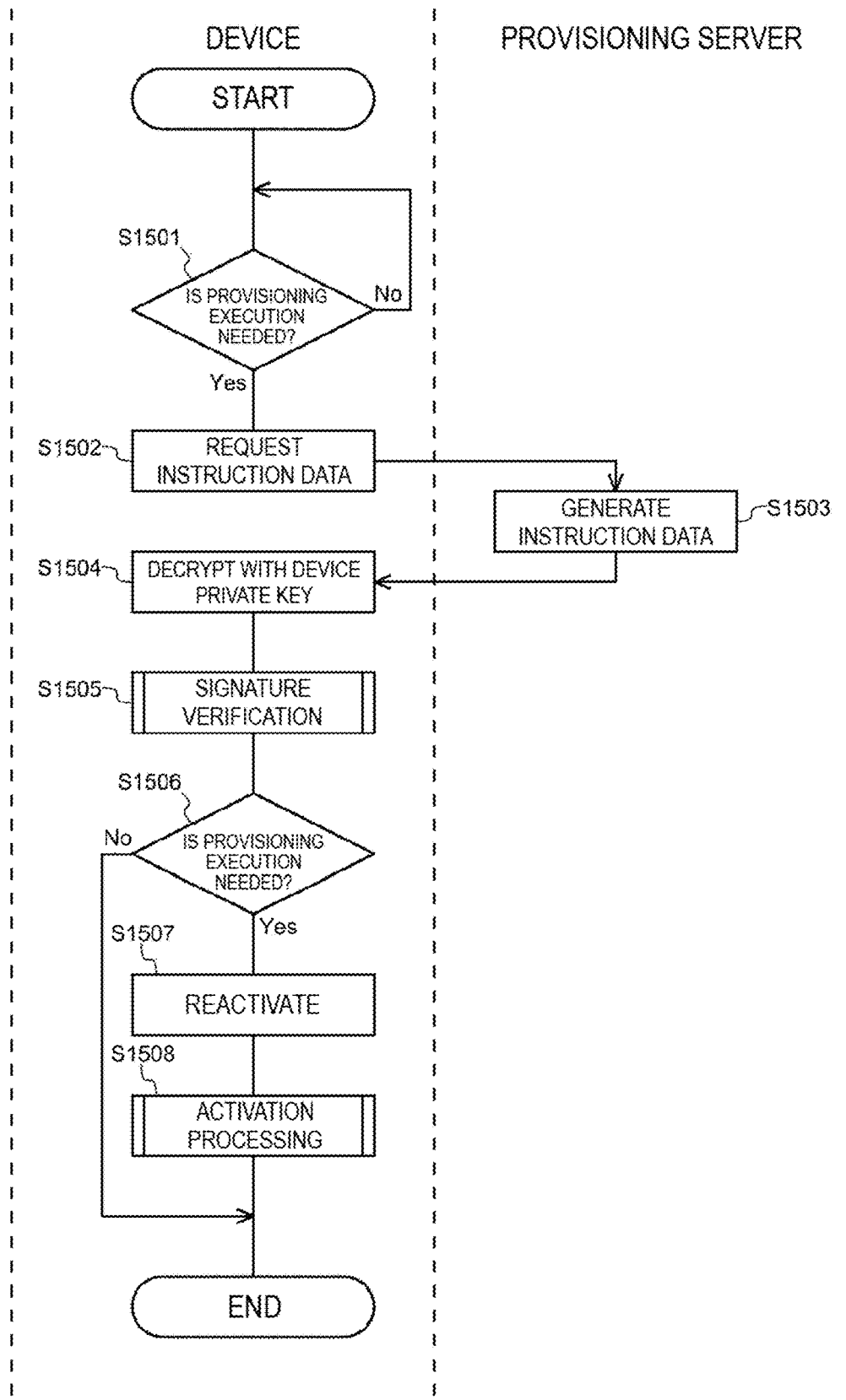
FIG. 28 is a flowchart illustrating the process of provisioning processing based on an instruction from the device in the embodiment of the present invention.

FIG. 28 illustrates the process of provisioning processing based on an instruction from the device 4, as another example of the provisioning processing by the device provisioning system according to the present embodiment. First, at step S1501, the device 4 determines whether the provisioning processing needs to be performed on the device 4, and waits until it is determined that the provisioning processing is needed.

The criteria of the determination may be registered to the device 4 in advance. For example, the provisioning processing may be set to be performed in each predetermined duration or may be performed as needed through an operation of the device 4 in operation. When the device 4 includes an acquirer of position information, the provisioning processing may be executed in accordance with change in the status of the device 4, for example, the provisioning processing may be performed when movement is performed beyond a predetermined range.

Then, when it is determined at step S1501 that the provisioning instruction is needed, the process proceeds to step S1502 to perform a request of the instruction data DN as illustrated in FIG. 26 to the provisioning server 3. This is performed when the device 4 transmits the device trail of the device 4 recorded in the normal region 45b to the provisioning server 3.

Processing at the following steps S1503 to S1508 is performed similarly to the processing at steps S1402 to S1407 when the provisioning processing is performed based on an instruction from the provisioning server 3 as described above with reference to FIG. 27.

Through the processing as described above, the provisioning processing can be executed based on an instruction from the device 4 in operation. Accordingly, as described above, the provisioning processing can be executed on the device 4 on which the OS or the like are operational at an optional timing set in advance or based on an operation by the administrator or the like.

This is processing executed while the OS or the like is operational on the device 4 as described above, and thus, similarly to the case in which the provisioning processing is performed based on an instruction from the provisioning server 3 as described above with reference to FIG. 27, processing from the reception of the instruction data DN at step S1504 to the reactivation at step S1507 may be executed by a service or the like in operation on the OS of the device 4.

Although FIG. 27 illustrates the example in which the provisioning processing is executed based on an instruction from the provisioning server 3 and FIG. 28 illustrates the example in which the provisioning processing is executed based on an instruction from the device 4 in operation, the reinitialization processing of the device 4 may be preferably performed in a similar manner. Specifically, at the reactivation processing of the device 4 at steps S1406 and S1507, for example, parameters are transferred to perform the reinitialization processing illustrated in FIG. 24 instead of performing processing at normal activation at steps S1407 and S1508 after the reactivation.

As described above, the device provisioning according to the present embodiment can be performed while high security is maintained through distribution of provisioning data by using a device private key and a device public key unique to each device.

In addition, such a characteristic of a blockchain that it is difficult to perform, for example, unauthorized falsification processing on data registered once and block deletion is utilized to manage a device public key on the blockchain without a large number of electronic certificates while a private key and a public key for each device are used.

Managing each device through registration of the device public key unique to the device onto the blockchain is equivalent to managing the device on the blockchain, and thus prevents an unauthorized device from intruding into the system, thereby establishing the secure system.

REFERENCE SIGNS LIST 1 device authentication server
11 trail registration means 12 trail invalidation means
13 public key providing means
2 blockchain
3 provisioning server
31 provisioning data providing means
32 device initialization library
32a device identification data providing means
32b activation key providing means
33 activation program storage unit
34 device information storage unit
4 device
41 initial provisioning check means
42 provisioning execution means
43 system activation means
44 reinitialization means
45 storage unit
45a secure region
45b normal region
5 production site system
51 device initialization library
51a device identification data providing means
51b activation key providing means
52 device information storage unit

The invention claimed is:

1. A device provisioning system that provides a device with provisioning data for provisioning the device and loads the provisioning data onto the device, the device provisioning system comprising:
a blockchain storing a trail and a public key in correspondence;
a device authentication server communicating with the blockchain and comprising a processor and a memory;
a provisioning server comprising a processor and a memory,
wherein the memory of the provisioning server stores a private key for verification that is paired with a public key for verification to which a trail for verification is associated on the blockchain; and
the device comprising a processor and a memory,
wherein the memory of the device comprises a secure region in which a private key of the device is stored and a normal region in which a trail of the device and the trail for verification are stored;
wherein the processor of the device authentication server is configured to register a public key of the device unique to the device in the blockchain, to acquire the trail of the device through registration of the public key of the device to the blockchain and to return the trail of the device to the provisioning server, and
to acquire the public key of the device from the blockchain in response to a query using the trail of the device;
wherein the processor of the provisioning server is configured to acquire the public key of the device through the device authentication server,
to add a signature using the private key for verification, and
to transmit the provisioning data encrypted with the public key of the device to the device in response to a query using the trail of the device from the device; and
wherein the processor of the device is configured to acquire the provisioning data encrypted in response to a query using the trail of the device to the provisioning server,
to decrypt the encrypted provisioning data by using the private key of the device, and to acquire the public key for verification through the device authentication server and the blockchain and to verify the signature.

2. The device provisioning system according to claim 1, wherein:
when, in an initial state in which the device is not provided with the provisioning data, the memory of the device is storing an initial use private key unique to the device in the secure region and a device identification data including an initial use public key corresponding to the initial use private key in the normal region,
when the processor of the provisioning server is successful in verification of validity of the device based on the device identification data transmitted from the device,
the processor of the provisioning server is configured to generate the private key of the device and the public key of the device,
to acquire the trail of the device through registration of the public key of the device to the blockchain by the device authentication server, and
to transmit initial use data including the private key of the device and the trail of the device and encrypted with the initial use public key to the device, and
the processor of the device is configured to decrypt the encrypted initial use data by using the initial use private key, and
to store the private key of the device in the secure region and the trail of the device in the normal region.

3. The device provisioning system according to claim 2, wherein:
the processor of the device authentication server is configured to invalidate the trail of the device and the public key of the device in the blockchain;
the processor of the provisioning server is configured to transmit a new initial use private key and new device identification data including a new initial use public key corresponding to the new initial use private key to the device; and
the processor of the device is configured to store the new initial use private key in the secure region, to delete the private key of the device from the secure region, to store the new device identification data in the normal region, to delete the trail of the device from the normal region, and to request invalidation of the trail of the device and the public key of the device in the blockchain.

4. The device provisioning system according to claim 3, wherein,
when the processor of the provisioning server checks necessity of updating the trail of the device and the public key of the device registered to the blockchain and determines that the trail of the device and the public key of the device need to be updated,
the processor of the provisioning server is configured to generate a new private key of the device and a new public key of the device,
to acquire a new trail of the device through registration of the new public key of the device to the blockchain by the device authentication server, and
to add the new private key of the device and the new trail of the device in the provisioning data, and
the processor of the device is configured to store the new private key of the device in the secure region,
to store the new trail of the device in the normal region, to delete the private key of the device from the secure region, and to delete the trail of the device from the normal region.

5. The device provisioning system according to claim 1, wherein the provisioning data includes a program file configured to operate on the device.

6. The device provisioning system according to claim 5, wherein the program file is a program file for activation of the device, and the processor of the device is configured to acquire the provisioning data at activation of the device.

7. A provisioning method of providing a device with provisioning data for provisioning the device and loading the provisioning data onto the device, executed by a blockchain storing a trail and a public key in correspondence, the device comprising a processor and a memory, a provisioning server comprising a processor and a memory, and a device authentication server communicating with the blockchain and comprising a processor and a memory, the provisioning method comprising:

registering, by the processor of the device authentication server, a public key of the device unique to the device in the blockchain, acquiring, by the processor of the device authentication server, a trail of the device through registration of the public key of the device to the blockchain and returning, by the processor of the device authentication server, the trail of the device to the provisioning server;

acquiring, by the processor of the device authentication server, the public key of the device from the blockchain in response to a query using the trail of the device;

acquiring, by the processor of the provisioning server, the public key of the device through the device authentication server;

adding a signature using the private key for verification;

transmitting the provisioning data encrypted with the public key of the device to the device in response to a query using the trail of the device from the device;

acquiring, by the processor of the device, the provisioning data encrypted in response to a query using the trail of the device to the provisioning server;

decrypting, by the processor of the device, the encrypted provisioning data by using the private key of the device; and acquiring, by the processor of the device, a public key for verification through the device authentication server and the blockchain to verify the signature, wherein the memory of the provisioning server stores a private key for verification that is paired with the public key for verification to which a trail for verification is associated on the blockchain, and the memory of the device comprises a secure region in which a private key of the device is stored and a normal region in which the trail of the device and the trail for verification are stored.

* * * * *